United States Patent
Inoue

(10) Patent No.: US 10,460,435 B2
(45) Date of Patent: Oct. 29, 2019

(54) PATTERN INSPECTION METHOD AND PATTERN INSPECTION APPARATUS

(71) Applicant: NuFlare Technology, Inc., Yokohama-shi (JP)

(72) Inventor: Takafumi Inoue, Chigasaki (JP)

(73) Assignee: NuFlare Technology, Inc., Yokohama-shi (JP)

( * ) Notice: Subject to any disclaimer, the term of this patent is extended or adjusted under 35 U.S.C. 154(b) by 316 days.

(21) Appl. No.: 15/480,051

(22) Filed: Apr. 5, 2017

(65) Prior Publication Data

US 2017/0316557 A1 Nov. 2, 2017

(30) Foreign Application Priority Data

Apr. 28, 2016 (JP) .................................. 2016-090747

(51) Int. Cl.
*G06T 7/00* (2017.01)

(52) U.S. Cl.
CPC .... *G06T 7/001* (2013.01); *G06T 2207/10056* (2013.01); *G06T 2207/20021* (2013.01); *G06T 2207/30148* (2013.01)

(58) Field of Classification Search
CPC .......... G06T 5/50; G06T 7/254; G06T 7/001; G06T 7/0002; G06T 2207/30164; G06T 2207/30141; G06T 2207/10056; G06T 2207/20021; G06T 2207/30148; G06K 9/6202

See application file for complete search history.

(56) References Cited

U.S. PATENT DOCUMENTS

| | | | | |
|---|---|---|---|---|
| 8,638,854 B1* | 1/2014 | Bankoski | ............. | H04N 19/105 375/240.14 |
| 2006/0193507 A1* | 8/2006 | Sali | ................... | G01N 21/9501 382/145 |
| 2009/0238441 A1* | 9/2009 | Yamashita | .............. | G06T 7/001 382/144 |
| 2014/0307254 A1* | 10/2014 | Yamashita | ....... | G01N 21/95607 356/237.5 |
| 2014/0307945 A1* | 10/2014 | Yasui | ................... | G06T 7/0008 382/149 |

FOREIGN PATENT DOCUMENTS

JP 2014-206466 10/2014

* cited by examiner

*Primary Examiner* — Carol Wang
(74) *Attorney, Agent, or Firm* — Oblon, McClelland, Maier & Neustadt, L.L.P.

(57) ABSTRACT

A pattern inspection method includes calculating a first coefficient of a filter function by using data of optical images of plural small regions selected and data of developed images of the plural small regions based on design data; calculating a second coefficient of a filter function by using data of an optical image of a reference small region selected and data of a developed image of the reference small region selected; and determining, for each pixel, whether there exists a pixel for which a difference, between a first temporary reference image to be compared with the optical image of the reference small region generated using the filter function in which the first coefficient is defined and a second temporary reference image to be compared with the optical image of the reference small region generated using the filter function in which the second coefficient is defined, is larger than a threshold.

3 Claims, 13 Drawing Sheets

PATTERN INSPECTION METHOD AND PATTERN INSPECTION APPARATUS

CROSS-REFERENCE TO RELATED APPLICATION

This application is based upon and claims the benefit of priority from the prior Japanese Patent Application No. 2016-090747 filed on Apr. 28, 2016 in Japan, the entire contents of which are incorporated herein by reference.

BACKGROUND OF THE INVENTION

Field of the Invention

Embodiments of the present invention relate generally to a pattern inspection method and a pattern inspection apparatus. More specifically, for example, embodiments of the present invention relate to a pattern inspection technique for inspecting pattern defects of an object serving as a target workpiece or "sample" used in manufacturing semiconductor devices, and to an inspection method for inspecting defects of minute patterns formed on a photomask, wafer, or liquid crystal substrate used in manufacturing semiconductor elements or liquid crystal displays (LCDs).

Description of Related Art

In recent years, with the advance of high integration and large capacity of large-scale integration (LSI) circuits, the line width (critical dimension) required for circuits of semiconductor elements is becoming progressively narrower. Such semiconductor elements are manufactured by circuit formation of exposing and transferring a pattern onto a wafer by means of a reduced projection exposure apparatus known as a stepper while using an original or "master" pattern (also called a mask or a reticle, hereinafter generically referred to as a mask) with a circuit pattern formed thereon. Then, in fabricating a mask for transfer printing such a fine circuit pattern onto a wafer, a pattern writing apparatus capable of writing or "drawing" fine circuit patterns by using electron beams needs to be employed. Pattern circuits may be written directly on the wafer by the pattern writing apparatus. Also, a laser beam writing apparatus that uses laser beams in place of electron beams for writing a pattern is under development.

Since LSI manufacturing requires a tremendous amount of manufacturing cost, it is crucial to improve its yield. However, as typified by a 1-gigabit DRAM (Dynamic Random Access Memory), the scale of patterns configuring an LSI is in transition from on the order of submicrons to nanometers. One of major factors that decrease the yield of the LSI manufacturing is due to pattern defects on the mask used for exposing and transfer printing an ultrafine pattern onto a semiconductor wafer by the photolithography technology. In recent years, with miniaturization of dimensions of LSI patterns formed on a semiconductor wafer, dimension to be detected as a pattern defect has become extremely small. Therefore, a pattern inspection apparatus for inspecting defects on a transfer mask used in manufacturing LSI needs to be more highly accurate.

As an inspection method, there is known a method of comparing an optical image obtained by imaging a pattern formed on a target object or "sample" such as a lithography mask at a predetermined magnification by using a magnification optical system with design data or an optical image obtained by imaging the same pattern on the target object. For example, the methods described below are known as pattern inspection methods: the "die-to-die inspection" method that compares data of optical images of identical patterns at different positions on the same mask; and the "die-to-database inspection" method that inputs, into an inspection apparatus, writing data (design data) generated by converting pattern-designed CAD data to a writing apparatus specific format to be input to the writing apparatus when a pattern is written on the mask, generates a design image (reference image) based on the input writing data, and compares the generated design image with an optical image (serving as measurement data) obtained by imaging the pattern. In such inspection methods for use in the inspection apparatus, a target object is placed on the stage so that a light flux may scan the target object as the stage moves in order to perform an inspection. Specifically, the target object is irradiated with a light flux from the light source through the illumination optical system. Light transmitted through the target object or reflected therefrom forms an image on a sensor through the optical system. The image captured by the sensor is transmitted as measurement data to the comparison circuit. After performing position adjustment of images, the comparison circuit compares measurement data with reference data in accordance with an appropriate algorithm, and determines that there exists a pattern defect if a result of the algorithm is not within an allowable range.

At this stage, even though a developed image obtained by performing image development of design data, and an optical image actually captured from the substrate are based on the same figure pattern, if no processing is performed on them, they never be coincident with each other. Accordingly, it is necessary to perform filter processing on the developed image in order to generate a reference image which is quality-wise close to the optical image (e.g., refer to Japanese Patent Application Laid-open No. 2014-206466). Therefore, it is necessary to prepare a highly accurate filter function. A coefficient of the filter function is calculated using an actual pattern in a partial region of the substrate to be inspected. However, when performing calculation to acquire the coefficient of the filter function, if a region where a defect exists is selected, it results in including an error in the calculated coefficient. Thus, there is a problem in that, if the filter function of the obtained coefficient is applied to the other region in order to generate a reference image, there frequently occur false or "pseudo" defects which are determined to be defective in spite of not being defective. Therefore, in order to perform pattern inspection, it is required that an appropriate coefficient of the filter function has already been acquired.

BRIEF SUMMARY OF THE INVENTION

According to one aspect of the present invention, a pattern inspection method includes calculating a first coefficient of a filter function for generating a reference image, by using data of an optical image of each of a plurality of small regions each having a predetermined size selected from an inspection region of a substrate to be inspected on which a plurality of figure patterns are formed, and data of a developed image generated by performing image development of a pattern arranged in the each of the plurality of small regions based on design data used as a basis for forming the plurality of figure patterns on the substrate to be inspected; calculating a second coefficient of a filter function for generating a reference image, by using data of an optical image of a reference small region selected from the plurality of small regions, and data of a developed image of the reference small region selected; determining, for each pixel, whether there exists a pixel for which a difference, between a first temporary reference image to be compared with the optical image of the reference small region generated using the filter function in which the first coefficient is defined and a second temporary reference image to be compared with the optical image of the reference small region generated using the filter function in which the second coefficient is defined, is larger than a threshold; and inspecting the pattern in the inspection region by using the reference image generated based on the filter function in which the first coefficient is defined, for each of a plurality of inspection unit regions into which the inspection region of the substrate to be inspected is divided by a size same as the predetermined size, wherein, based on the determining, in a case where the pixel for which the difference is larger than the threshold exists, the inspecting the pattern in the inspection region is stopped beforehand.

According to another aspect of the present invention, a pattern inspection method includes calculating a coefficient of a filter function for generating a reference image, by using data of an optical image of a first small region having a predetermined size selected from an inspection region of a substrate to be inspected on which a plurality of figure patterns are formed, and data of a developed image generated by performing image development of a pattern arranged in the first small region based on design data used as a basis for forming the plurality of figure patterns on the substrate to be inspected; determining whether the pattern arranged in the first small region is a repetitive pattern; extracting, in a case where the pattern arranged in the first small region is the repetitive pattern, a second small region, being different from the first small region, in which a repetitive pattern of a same type as that of the repetitive pattern in the first small region is arranged, from the inspection region; determining, for each pixel, whether there exists a pixel for which a difference, between data of an optical image of the second small region and data of a reference image of the second small region generated using the filter function in which the coefficient is defined, is larger than a threshold; and inspecting the pattern in the inspection region by using the reference image generated based on the filter function in which the coefficient is defined, for each of a plurality of inspection unit regions into which the inspection region of the substrate to be inspected is divided by a size same as the predetermined size, wherein, based on the determining, in a case where the pixel for which the difference is larger than the threshold exists, the inspecting the pattern in the inspection region is stopped beforehand.

According to yet another aspect of the present invention, a pattern inspection method includes calculating a first coefficient of a filter function for generating a reference image, by using data of an optical image of a first small region having a predetermined size selected from an inspection region of a substrate to be inspected on which a plurality of figure patterns are formed, and data of a developed image generated by performing image development of a pattern arranged in the first small region based on design data used as a basis for forming the plurality of figure patterns on the substrate to be inspected; determining, for each pixel, whether there exists a pixel for which a difference, between the data of the optical image of the first small region and data of the reference image of the first small region generated using the filter function in which the first coefficient is defined, is larger than a threshold; calculating a second coefficient of a filter function for generating a reference image by using data of an optical image of a second small region having a predetermined size at a position shifted in an oblique direction from the first small region, and data of a developed image generated by performing image development of a pattern arranged in the second small region, in a case where, based on the determining, the pixel for which the difference is larger than the threshold exists; and inspecting the pattern in the inspection region by using the reference image generated based on the filter function, for each of a plurality of inspection unit regions into which the inspection region of the substrate to be inspected is divided by a size same as the predetermined size, wherein, based on the determining, in a case where the pixel for which the difference is larger than the threshold does not exist, the reference image used for inspecting the pattern in the inspection region is generated using the filter function in which the first coefficient is defined, and in a case where the pixel for which the difference is larger than the threshold exists, the reference image used for inspecting the pattern in the inspection region is generated using the filter function in which the second coefficient is defined.

According to yet another aspect of the present invention, a pattern inspection apparatus includes a first coefficient calculation processing circuitry configured to calculate a first coefficient of a filter function for generating a reference image, by using data of an optical image of each of a plurality of small regions each having a predetermined size selected from an inspection region of a substrate to be inspected on which a plurality of figure patterns are formed, and data of a developed image generated by performing image development of a pattern arranged in the each of the plurality of small regions based on design data used as a basis for forming the plurality of figure patterns on the substrate to be inspected; a second coefficient calculation processing circuitry configured to calculate a second coefficient of a filter function for generating a reference image, by using data of an optical image of a reference small region selected from the plurality of small regions, and data of a developed image of the reference small region selected; a determination processing circuitry configured to perform determination, for each pixel, whether there exists a pixel for which a difference, between a first temporary reference image to be compared with the optical image of the reference small region generated using the filter function in which the first coefficient is defined and a second temporary reference image to be compared with the optical image of the reference small region generated using the filter function in which the second coefficient is defined, is larger than a threshold; a reference image generation processing circuitry configured to generate the reference image by using the filter function in which the first coefficient is defined, for each of a plurality of inspection unit regions into which the inspection region of the substrate to be inspected is divided by a size same as the predetermined size; an optical image acquisition mechanism configured to include a stage for mounting thereon the substrate to be inspected, an illumination optical system for illuminating the substrate to be inspected, and a sensor for capturing an optical image at an illuminated position, and to acquire the optical image in the inspection region; a comparison processing circuitry configured to compare the optical image with the reference image, for the each of the plurality of inspection unit regions; and an inspection control processing circuitry configured to beforehand stop inspecting the pattern in the inspection region, in a case where, based on the determination, the pixel for which the difference is larger than the threshold exists.

According to yet another aspect of the present invention, a pattern inspection apparatus includes a coefficient calculation processing circuitry configured to calculate a coefficient of a filter function for generating a reference image, by using data of an optical image of a first small region having a predetermined size selected from an inspection region of a substrate to be inspected on which a plurality of figure patterns are formed, and data of a developed image generated by performing image development of a pattern arranged in the first small region based on design data used as a basis for forming the plurality of figure patterns on the substrate to be inspected; a first determination processing circuitry configured to perform determination whether the pattern arranged in the first small region is a repetitive pattern; an extraction processing circuitry configured to extract, in a case where the pattern arranged in the first small region is the repetitive pattern, a second small region, being different from the first small region, in which a repetitive pattern of a same type as that of the repetitive pattern in the first small region is arranged, from the inspection region; a second determination processing circuitry configured to perform determination, for each pixel, whether there exists a pixel for which a difference, between data of an optical image of the second small region and data of a reference image of the second small region generated using the filter function in which the coefficient is defined, is larger than a threshold; a reference image generation processing circuitry configured to generate the reference image by using the filter function in which the coefficient is defined, for each of a plurality of inspection unit regions into which the inspection region of the substrate to be inspected is divided by a size same as the predetermined size; an optical image acquisition mechanism configured to include a stage for mounting thereon the substrate to be inspected, an illumination optical system for illuminating the substrate to be inspected, and a sensor for capturing an optical image at an illuminated position, and to acquire the optical image in the inspection region; a comparison processing circuitry configured to compare the optical image with the reference image, for the each of the plurality of inspection unit regions; and an inspection control processing circuitry configured to beforehand stop inspecting the pattern in the inspection region, in a case where, based on the determination, the pixel for which the difference is larger than the threshold exists.

According to yet another aspect of the present invention, a pattern inspection apparatus includes: a coefficient calculation processing circuitry configured to calculate a first coefficient of a filter function for generating a reference image, by using data of an optical image of a first small region having a predetermined size selected from an inspection region of a substrate to be inspected on which a plurality of figure patterns are formed, and data of a developed image generated by performing image development of a pattern arranged in the first small region based on design data used as a basis for forming the plurality of figure patterns on the substrate to be inspected; and a determination processing circuitry configured to perform determination, for each pixel, whether there exists a pixel for which a difference, between the data of the optical image of the first small region and data of the reference image of the first small region generated using the filter function in which the first coefficient is defined, is larger than a threshold, wherein, in a case where, based on the determination, the pixel for which the difference is larger than the threshold exists, the coefficient calculation processing circuitry calculates a second coefficient of a filter function for generating a reference image by using data of an optical image of a second small region having a predetermined size at a position shifted in an oblique direction from the first small region, and data of a developed image generated by performing image development of a pattern arranged in the second small region, and further includes: a reference image generation processing circuitry configured to generate the reference image by using the filter function in which one of the first coefficient and the second coefficient is defined, for each of a plurality of inspection unit regions into which the inspection region of the substrate to be inspected is divided by a size same as the predetermined size; an optical image acquisition mechanism configured to include a stage for mounting thereon the substrate to be inspected, an illumination optical system for illuminating the substrate to be inspected, and a sensor for capturing an optical image at an illuminated position, and to acquire the optical image in the inspection region; and a comparison processing circuitry configured to compare the optical image with the reference image, for the each of the plurality of inspection unit regions, wherein, based on the determination, in a case where the pixel for which the difference is larger than the threshold does not exist, the reference image used for inspecting the pattern in the inspection region is generated using the filter function in which the first coefficient is defined, and in a case where the pixel for which the difference is larger than the threshold exists, the reference image used for inspecting the pattern in the inspection region is generated using the filter function in which the second coefficient is defined.

DETAILED DESCRIPTION OF THE INVENTION

Embodiments of the present invention describe a pattern inspection method by which inspection using an unsuitable filter function coefficient can be obviated, and an inspection apparatus employing the inspection method. Moreover, Embodiments of the present invention describe a pattern inspection method by which an efficiently suitable filter function coefficient can be acquired, and an inspection apparatus employing the inspection method.

First Embodiment

Figure 1:
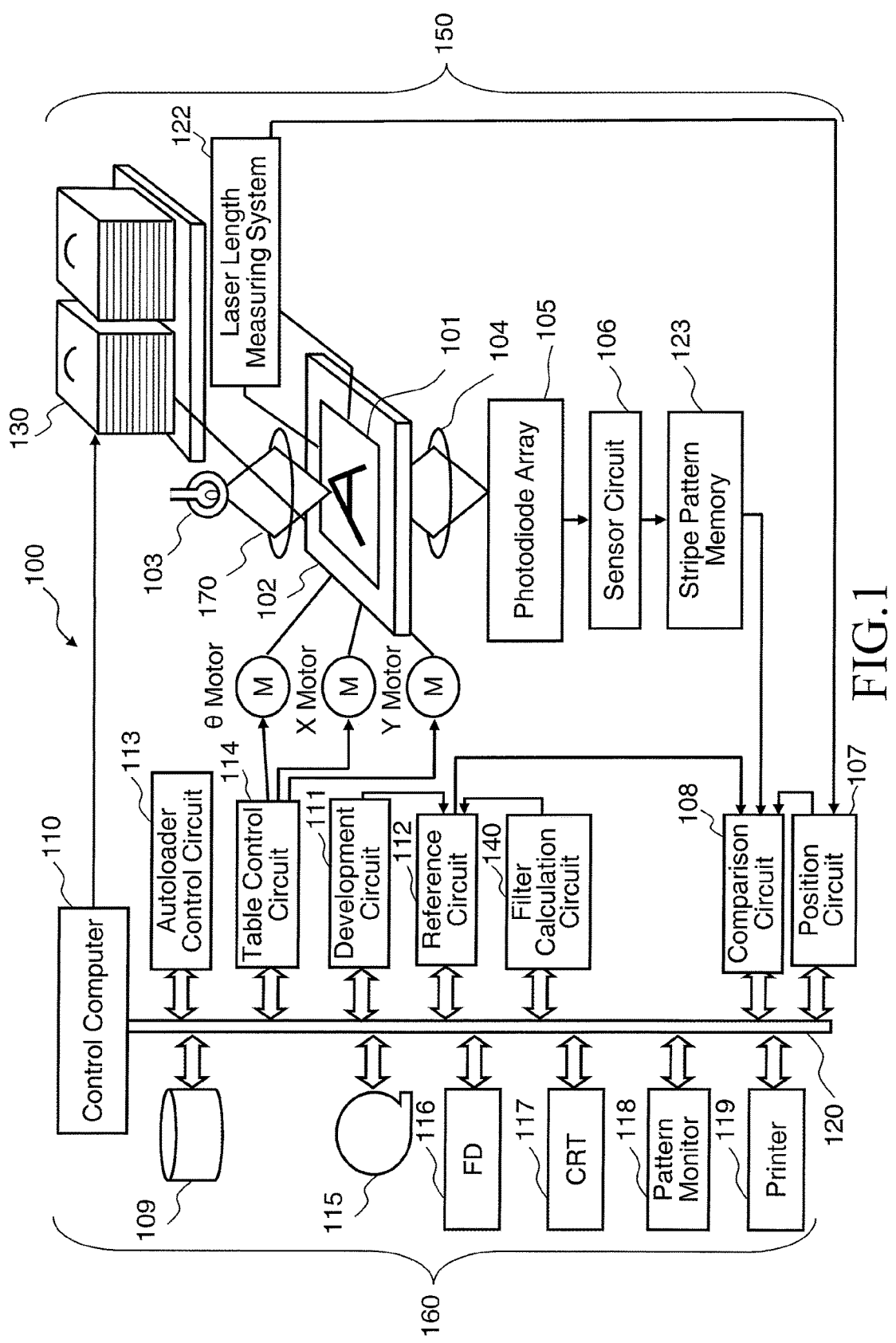
FIG. 1 illustrates a configuration of a pattern inspection apparatus according to a first embodiment.

FIG. 1 illustrates a configuration of a pattern inspection apparatus according to a first embodiment. As shown in FIG. 1, an inspection apparatus 100 that inspects defects of a pattern formed on a substrate to be inspected (an inspection substrate or "object" to be examined), such as a mask, includes an optical image acquisition mechanism 150 and a control system circuit 160 (control unit).

The optical image acquisition mechanism 150 includes a light source 103, an illumination optical system 170, an XYθ table 102 arranged movably, a magnifying optical system 104, a photodiode array 105 (an example of a sensor), a sensor circuit 106, a stripe pattern memory 123, and a laser length measuring system 122. A substrate 101 is placed on the XYθ table 102. The substrate 101 is, for example, an exposure photomask used for transfer printing a pattern onto a semiconductor substrate, such as a wafer. A plurality of figure patterns to be inspected are formed on the photomask. The substrate 101 is arranged, for example, with its pattern forming surface facing downward, on the XYθ table 102.

In the control system circuit 160, a control computer 110 is connected, through a bus 120, to a position circuit 107, a comparison circuit 108, a development circuit 111, a reference circuit 112, an autoloader control circuit 113, a table control circuit 114, a filter calculation circuit 140, a magnetic disk drive 109, a magnetic tape drive 115, a flexible disk drive (FD) 116, a CRT 117, a pattern monitor 118, and a printer 119. The sensor circuit 106 is connected to the stripe pattern memory 123 which is connected to the comparison circuit 108. The XYθ table 102 is driven by motors of X, Y, and θ axes. The XYθ table 102 is an example of the stage.

Each circuit " . . . circuit", such as the position circuit 107, comparison circuit 108, development circuit 111, reference circuit 112, autoloader control circuit 113, table control circuit 114, and filter calculation circuit 140 includes a processing circuitry. As the processing circuitry, for example, an electric circuit, computer, processor, circuit board, quantum circuit, semiconductor device, or the like can be used. Each " . . . circuit" may use a common processing circuitry (same processing circuitry), or different processing circuitries (separate processing circuitries). For example, each " . . . circuit", such as the position circuit 107, comparison circuit 108, development circuit 111, reference circuit 112, autoloader control circuit 113, table control circuit 114, and filter calculation circuit 140 may be configured and executed by the control computer 110. A program for causing a computer to execute the processor, etc. can be stored in a recording medium, such as the magnetic disk drive 109, magnetic tape drive 115, FD 116, ROM (Read Only Memory), or the like.

In the inspection apparatus 100, an inspection optical system of large magnification is composed of the light source 103, the XYθ table 102, the illumination optical system 170, the magnifying optical system 104, the photodiode array 105, and the sensor circuit 106. The XYθ table 102 is driven by the table control circuit 114 under the control of the control computer 110. The XYθ table 102 can be moved by a drive system such as a three-axis (X, Y, and θ) motor, which drives the table in the directions of x, y, and θ. For example, a step motor can be used as each of these X, Y, and θ motors. The XYθ table 102 is movable in the horizontal direction and the rotation direction by the motors of X, Y, and θ axes. The movement position of the substrate 101 placed on the XYθ table 102 is measured by the laser length measuring system 122, and supplied to the position circuit 107.

Design data (writing data) used as a basis for forming patterns on the substrate 101 to be inspected is input from the outside of the inspection apparatus 100, and stored in the magnetic disk drive 109.

FIG. 1 shows configuration elements necessary for describing the first embodiment. It should be understood that other configuration elements generally necessary for the inspection apparatus 100 may also be included therein.

Figure 2:
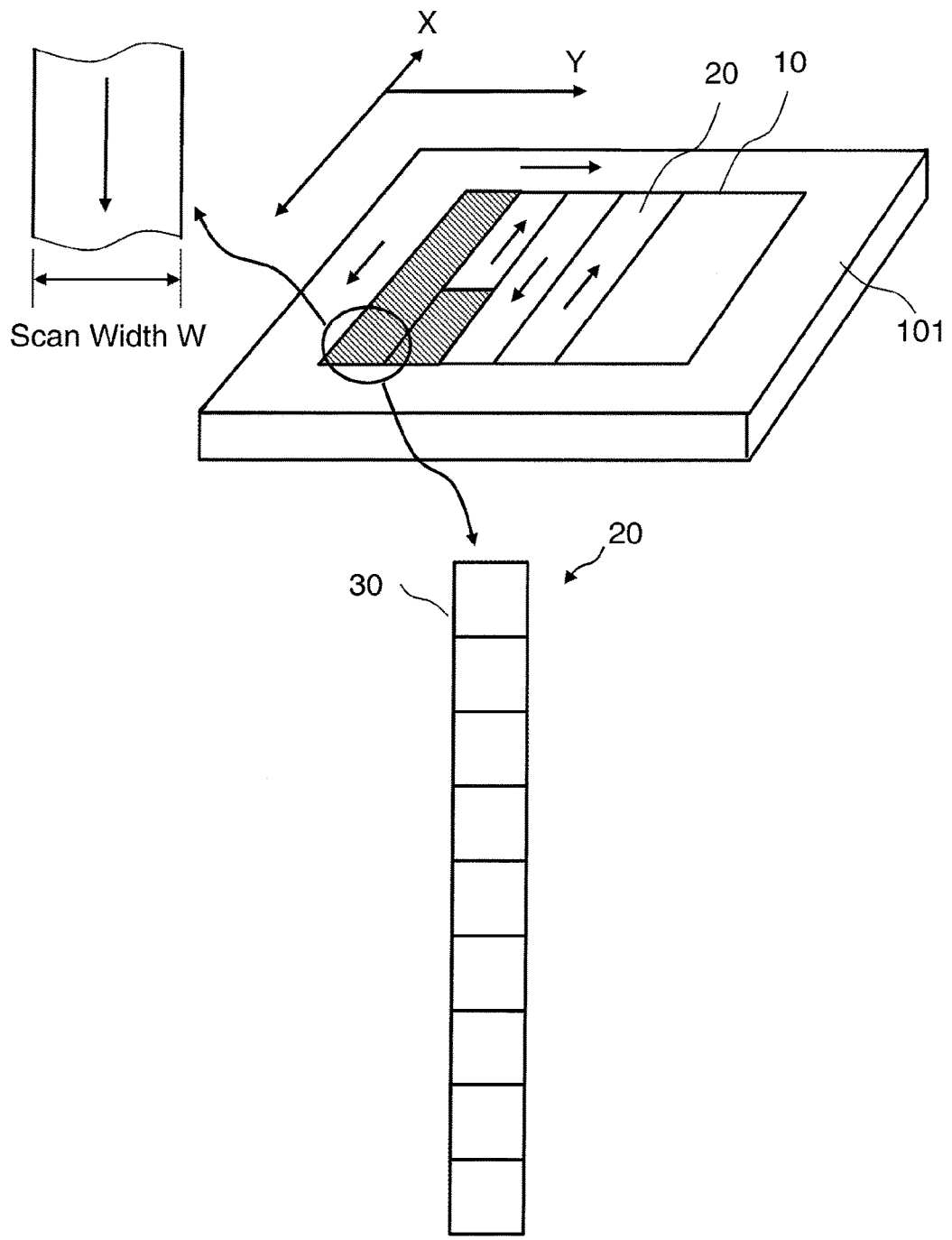
FIG. 2 is a conceptual diagram illustrating an inspection region according to the first embodiment.

FIG. 2 is a conceptual diagram illustrating an inspection region according to the first embodiment. As shown in FIG. 2, an inspection region 10 (entire inspection region) of the substrate 101 is virtually divided into a plurality of strip-shaped inspection stripes 20 each having a scan width W in the y direction, for example. The inspection apparatus 100 acquires an image (stripe region image) from each inspection stripe 20. That is, with respect to each of the inspection stripes 20, the inspection apparatus 100 captures an image of a figure pattern arranged in the stripe region concerned by using a laser light in the longitudinal direction (x direction) of the stripe region concerned. The photodiode array 105, which continuously moves relatively in the x direction by the movement of the XYθ table 120, acquires an optical image at the position irradiated with the laser light. The photodiode array 105 continuously captures optical images each having a scan width W as shown in FIG. 2. In other words, while moving relatively to the XYθ table 102 (stage), the photodiode array 105 being an example of a sensor captures optical images of patterns formed on the substrate 101 by using an inspection light. According to the first embodiment, after capturing an optical image in one inspection stripe 20, the photodiode array 105 moves in the y direction to the position of the next inspection stripe 20 and similarly captures another optical image having a scan width W continuously while moving in the direction reverse to the last image capturing direction. Thereby, the image capturing is repeated in the forward (FWD) and backward (BWD) directions, namely changing the direction reversely when advancing and returning.

In an actual inspection, as shown in FIG. 2, the stripe region image of each inspection stripe 20 is divided into a plurality of frame images 30 by a scan width in the longitudinal direction, for example. Then, inspection is performed for each frame image 30. A frame region is obtained by dividing the stripe region of each inspection stripe 20 by the size of the frame image 30. In other words, the stripe region of each inspection stripe 20 is divided into a plurality of frame regions by a scan width in the longitudinal direction as shown in FIG. 2. For example, it is divided into the size of 1024×1024 pixels. Therefore, a reference image to be compared with the frame image 30 is similarly generated for each frame region.

The direction of the image capturing is not limited to repeating the forward (FWD) and backward (BWD) movement. Images may be captured in a fixed one direction. For example, it is sufficient to repeat FWD and FWD, or alternatively, to repeat BWD and BWD.

Figure 3:
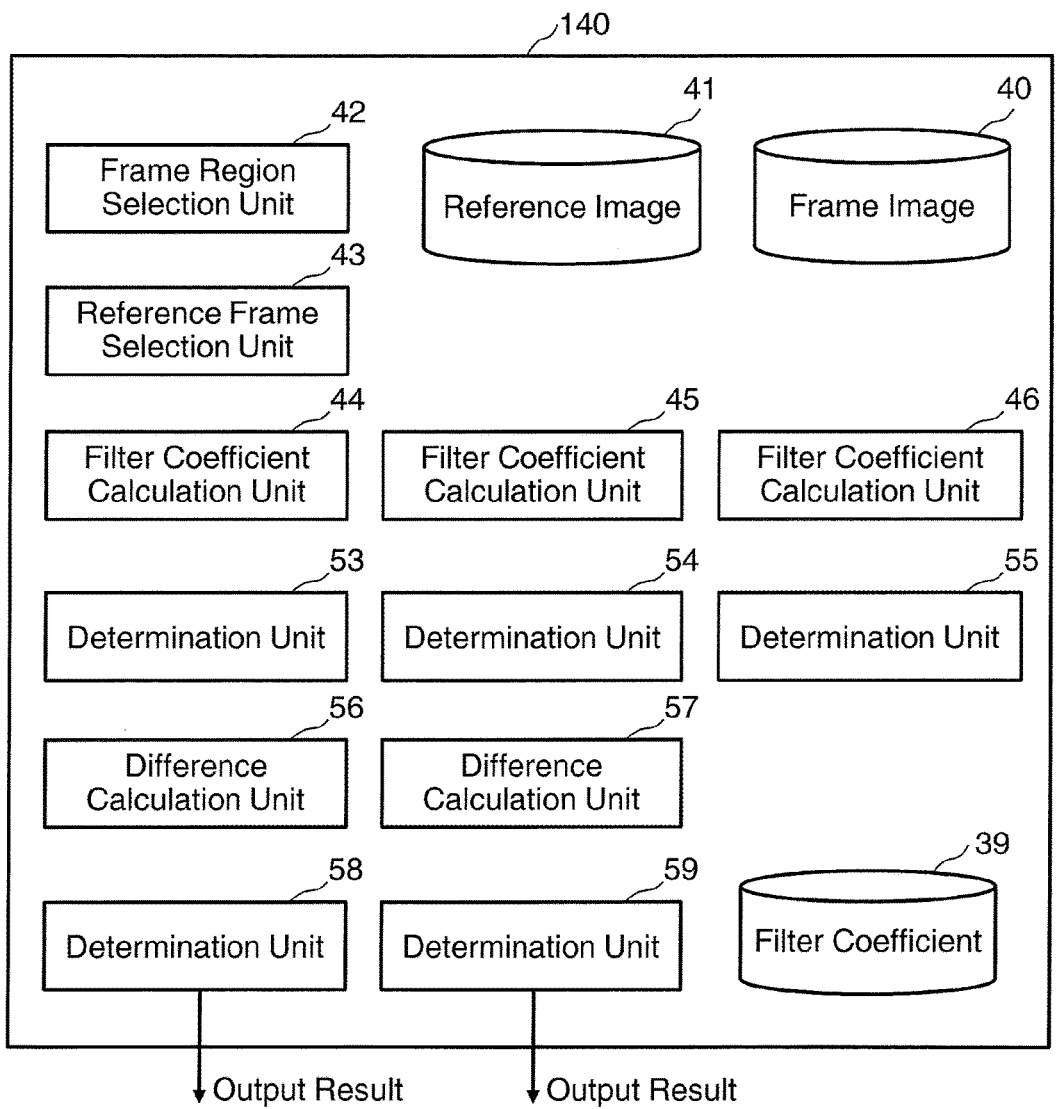
FIG. 3 shows an example of an internal configuration of a filter calculation circuit according to the first embodiment.

FIG. 3 shows an example of an internal configuration of a filter calculation circuit according to the first embodiment.

In FIG. 3, storage devices 39, 40, and 41, such as magnetic disk drives, a frame region selection unit 42, a reference frame selection unit 43, filter coefficient calculation units 44, 45, and 46, determination units 53, 54, and 55, difference calculation units 56, and 57, and determination units 58 and 59 are arranged in the filter calculation circuit 140. Each of the "units" such as the frame region selection unit 42, reference frame selection unit 43, filter coefficient calculation units 44, 45, and 46, determination units 53, 54, and 55, difference calculation units 56, and 57, and determination units 58 and 59 includes a processing circuitry. As the processing circuitry, for example, an electric circuit, computer, processor, circuit board, quantum circuit, or semiconductor device may be used. Each of the "circuits" may use a common processing circuitry (same processing circuitry), or different processing circuitries (separate processing circuitries). Input data required in the frame region selection unit 42, reference frame selection unit 43, filter coefficient calculation units 44, 45, and 46, determination units 53, 54, and 55, difference calculation units 56, and 57, and determination units 58 and 59, and calculated results are stored in a memory (not shown) each time.

Figure 4:
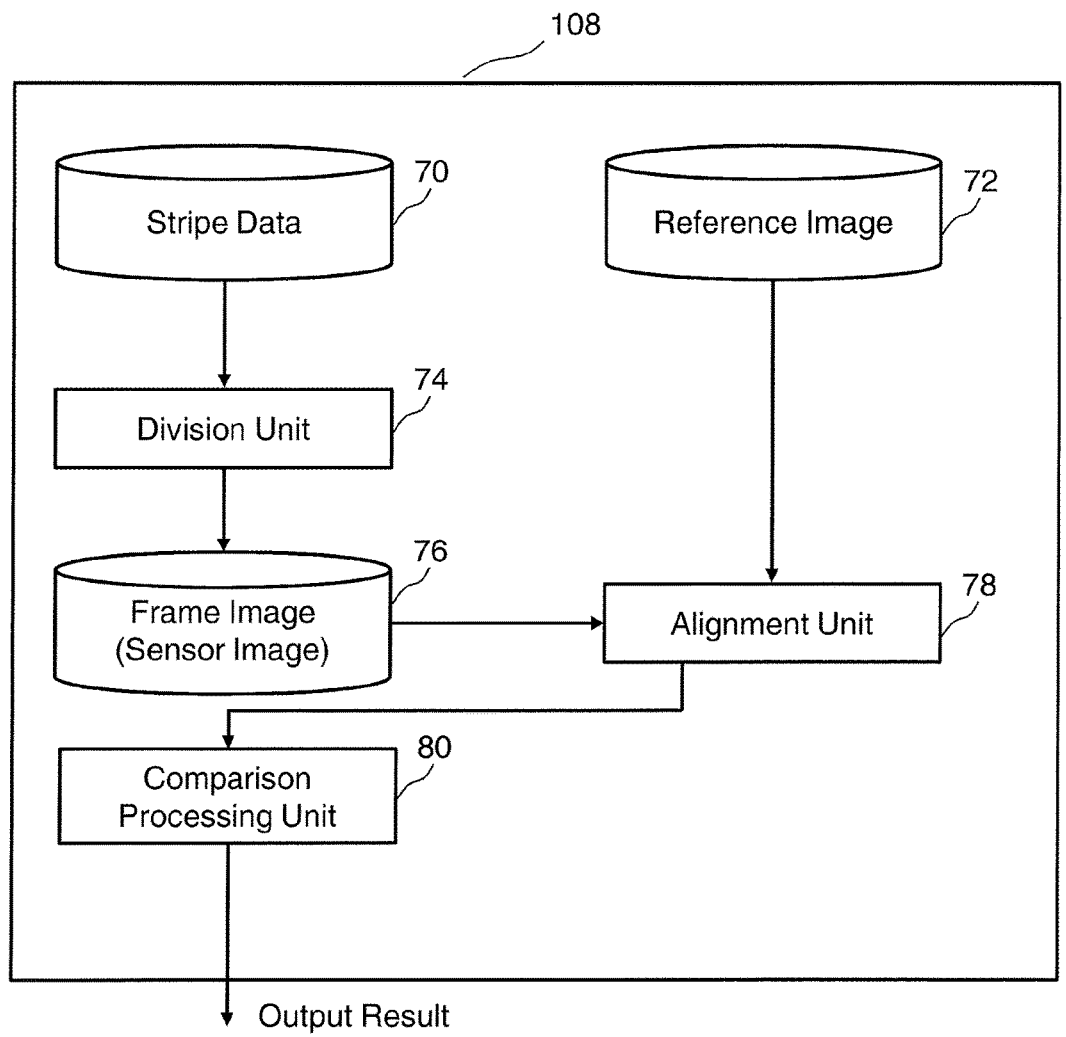
FIG. 4 shows an example of an internal configuration of a comparison circuit according to the first embodiment.

FIG. 4 shows an example of an internal configuration of a comparison circuit according to the first embodiment. In FIG. 4, storage devices 70, 72, and 76, such as magnetic disk drives, a division unit 74, an alignment unit 78, and a comparison processing unit 80 are arranged in the comparison circuit 108. Each of the "units" such as the division unit 74, the alignment unit 78, and the comparison processing unit 80 includes a processing circuitry. As the processing circuitry, for example, an electric circuit, computer, processor, circuit board, quantum circuit, or semiconductor device may be used. Each of the "circuits" may use a common processing circuitry (same processing circuitry), or different processing circuitries (separate processing circuitries). Input data required in the division unit 74, the alignment unit 78, and the comparison processing unit 80, and calculated results are stored in a memory (not shown) each time.

Figure 5:
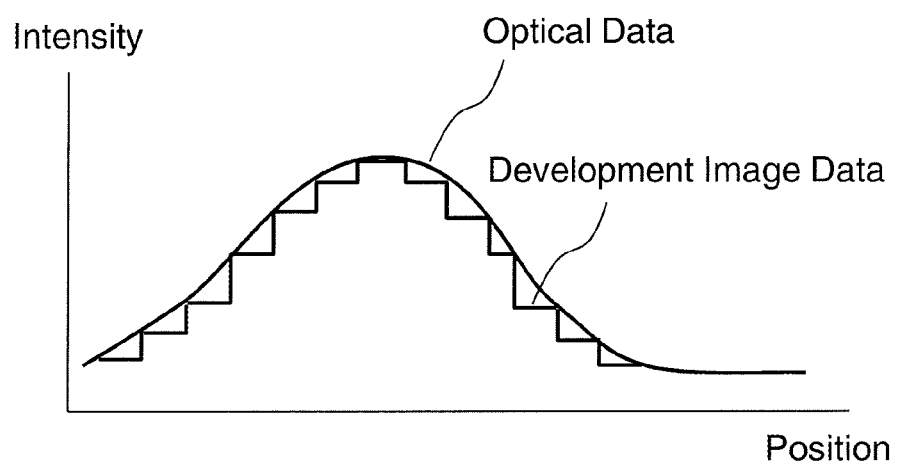
FIG. 5 illustrates filter processing according to the first embodiment.

FIG. 5 illustrates filter processing according to the first embodiment. Since pixel data of the optical image captured from the substrate 101 is in the state affected by filtering due to resolution characteristics etc. of the optical system used for image-capturing, in other words, in the analog state continuously changing, as shown in FIG. 5, the optical image is different from the developed image (design image) whose image intensity (gray value) is represented by digital values. Therefore, filter processing is performed on the developed image to make it quality-wise close to measurement image data, and then, comparison processing is performed. For this purpose, it is first necessary to calculate a coefficient of the filter function for performing that filter processing, in advance of performing inspection processing of the substrate 101.

Figure 6:
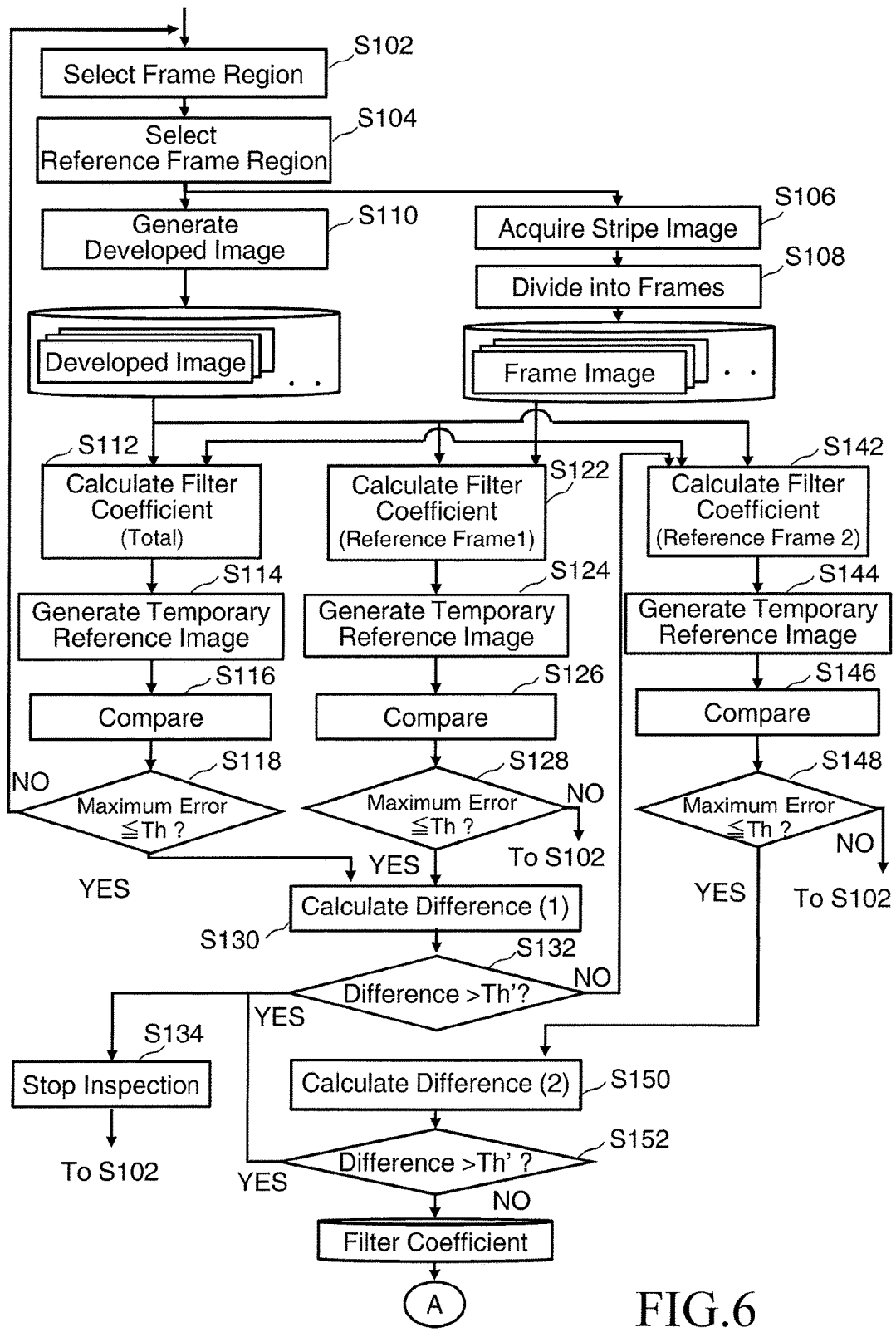
FIG. 6 is a flowchart showing main steps of a pattern inspection method according to the first embodiment.

FIG. 6 is a flowchart showing main steps of a pattern inspection method according to the first embodiment. As shown in FIG. 6, some part of the pattern inspection method of the first embodiment executes a series of steps: a frame selection step (S102), a reference frame region selection step (S104), a stripe image acquisition step (S106), a frame division step (S108), a developed image generation step (S110), a filter coefficient calculation step (S112), a temporary reference image generation step (S114), a comparison step (S116), a determination step (S118), a filter coefficient calculation step (S122), a temporary reference image generation step (S124), a comparison step (S126), a determination step (S128), a difference calculation (1) step (S130), a determination step (S132), an inspection stop processing step (S134), a filter coefficient calculation step (S142), a temporary reference image generation step (S144), a comparison step (S146), a determination step (S148), a difference calculation (2) step (S150), and a determination step (S152). The series of steps shown in FIG. 6 is also an example of a filter coefficient acquisition method.

In the frame selection step (S102), the frame region selection unit 42 selects a plurality of frame regions (small region) for calculating a filter coefficient from the inspection region 10 of the substrate 101 to be inspected. As described above, since image comparison is performed for each frame image 30, the selection is based on the frame region size. For example, five frame regions A to E are selected. Conditions of the selection may be appropriately set based on the size and position of a figure pattern defined by design data read from the magnetic disk drive 109. For example, the conditions are that there exists a right end side which is parallel to the left end side, a bottom end side which is parallel to the top end side, and so on. Thereby, it is possible to include, in reference frame candidates, a figure pattern which has four measurable edges or two paired edges (two sides) in the four measurable edges. Moreover, it is preferable to perform selection from the whole of the inspection region 10 of the substrate 101 not to be biased toward some portions of the inspection region 10.

In the reference frame region selection step (S104), the reference frame selection unit 43 selects a reference frame 1 (reference small region: first reference frame) from a plurality of frame regions (small region) A to E. For example, a frame region A is selected as a reference frame from a plurality of frame regions A to E. Moreover, according to the first embodiment, as another reference frame, a reference frame 2 (reference small region: second reference frame) is further selected. For example, a frame region B is selected as a reference frame from a plurality of frame regions A to E.

In the stripe image acquisition step (S106), the optical image acquisition mechanism 150 acquires optical images of a plurality of frame regions A to E selected by the user. Here, optical images of a plurality of inspection stripes 20 are acquired, where the number of the optical images is the number needed for obtaining optical images of a plurality of frame regions A to E selected by the user. Specifically, it operates as follows: First, the XYθ table 102 is moved to a position where the inspection stripe 20 including at least one of the selected plurality of frame regions A to E can be image-captured. A pattern formed on the substrate 101 is irradiated with a laser beam (e.g., DUV light) which is used as an inspection light and whose wavelength is shorter than or equal to that of the ultraviolet region, from the appropriate light source 103 through the illumination optical system 170. A light having passed through the substrate 101 is focused, through the magnifying optical system 104, to form an image on the photodiode array 105 (an example of a sensor) as an optical image to be input thereinto. Image-capturing of the inspection stripe 20 is repeated until optical images of all the plurality of frame regions A to E are included. If two or more of the selected plurality of frame regions A to E are included in the same inspection stripe 20, needless to say, the number of the inspection stripes 20 to be image-captured becomes reduced due to the included ones.

A pattern image focused/formed on the photodiode array 105 is photoelectrically converted by each light receiving element of the photodiode array 105, and further, analog-to-digital (A/D) converted by the sensor circuit 106. Then, pixel data for the inspection stripe 20 to be measured is stored in the stripe pattern memory 123. When imaging such pixel data (stripe region image), a dynamic range whose maximum gray level is defined as the case of, for example, 60% of the quantity of illumination light being incident is used as the dynamic range of the photodiode array 105. Then, the stripe region image is transmitted, with data indicating the position of the substrate 101 on the XYθ table 102 output from the position circuit 107, to the comparison circuit 108. Measurement data (pixel data) is 8-bit unsigned data, for example, and indicates a gray level (light intensity) of brightness of each pixel. The stripe region image input into the comparison circuit 108 is stored in the storage device 70. Here, since it is necessary to obtain reference data for generating a reference image, a stripe region image (optical image) is preferably acquired at the same resolution as that of inspection.

In the frame division step (S108), the division unit 74 specifies a plurality of frame regions A to E based on selection information selected by the frame region selection unit 42. The division unit 74 divides a stripe region image by a predetermined size (for example, the same width as the scan width W) in the x direction such that the selected plurality of frame regions A to E are clipped from the stripe region image (optical image) of a plurality of image-captured inspection stripes 20. For example, it is divided into frame images each having 1024×1024 pixels. Besides being stored in the storage device 76, image data of the divided plurality of frame regions A to E is output to the filter calculation circuit 140 to be stored in the storage device 40 in the filter calculation circuit 140.

In the developed image generation step (S110), the development circuit 111 specifies a plurality of frame regions A to E based on selection information selected by the frame region selection unit 42. Then, for each of the selected plurality of frame regions A to E, the development circuit 111 generates a developed image by image developing a pattern arranged in the frame region concerned, based on design data used as a basis for forming a plurality of figure patterns on the substrate 101 to be inspected. Specifically, for each of the plurality of frame regions A to E, the development circuit 111 reads design data from the magnetic disk drive 109 through the control computer 110, and generates a developed image (design image) by converting (image developing) each figure pattern in the frame region concerned defined in the design data having been read into image data of binary values or multiple values.

Here, basics of figures defined by the design data are, for example, rectangles or triangles. For example, there is stored figure data (vector data) defining the shape, size, position, and the like of each pattern figure by using information, such as coordinates (x, y) of the reference position of the figure, lengths of the sides of the figure, and a figure code serving as an identifier for identifying the figure type such as a rectangle, a triangle and the like.

When design pattern information used as figure data is input to the development circuit 111, the data is developed into data of each figure. Then, figure codes, figure dimensions and the like indicating figure shapes in the figure data are interpreted. Then, the development circuit 111 develops design image data of binary values or multiple values, as a pattern to be arranged in a square in units of grids of predetermined quantization dimensions, and outputs the developed data. In other words, the development circuit 111 reads design data, calculates the occupancy rate occupied by figures in a design pattern for each square obtained by virtually dividing an inspection region into squares in units of predetermined dimensions, and outputs n-bit occupancy data. For example, it is preferable that one square is set as one pixel. If one pixel has a resolution of $1/2^8$ (=1/256), 1/256 small regions, whose number is the same as that of figure regions arranged in a pixel, are allocated in order to calculate the occupancy rate in the pixel. Then, a developed image of 8-bit occupancy data is generated for each pixel. Besides being output to the reference circuit 112, developed image data is output to the filter calculation circuit 140 to be stored in the storage device 41 in the filter calculation circuit 140.

In the filter coefficient calculation step (S112), the filter coefficient calculation unit 44 (first coefficient calculation unit) calculates a coefficient (first coefficient) of a filter function for generating a reference image, by using data of frame images (optical images) of a plurality of frame regions A to E (small region) of a predetermined size selected from the inspection region 10 of the inspection substrate 101 on which a plurality of figure patterns are formed, and data of developed images generated by performing image development of patterns arranged in a plurality of frame regions A to E (small region) based on design data used as a basis for forming a plurality of figure patterns on the substrate 101 to be inspected. Here, the filter coefficient calculation unit 44 calculates a group of coefficients (first coefficient) of a filter function for all of a plurality of frame regions A to E (small region). Since all of a plurality of frame regions A to E are objects of calculation, an error can be averaged and a coefficient with great accuracy can be obtained.

Figure 7A:
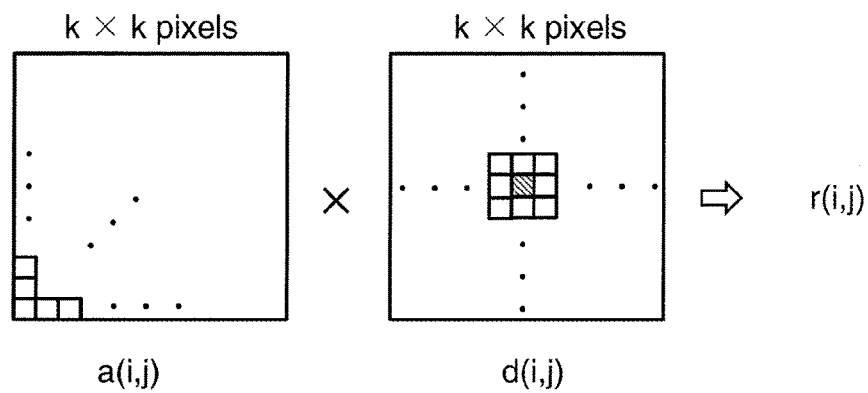
FIGS. 7A and 7B illustrate an example of a method for calculating a coefficient of a filter function according to the first embodiment.
Figure 7B:
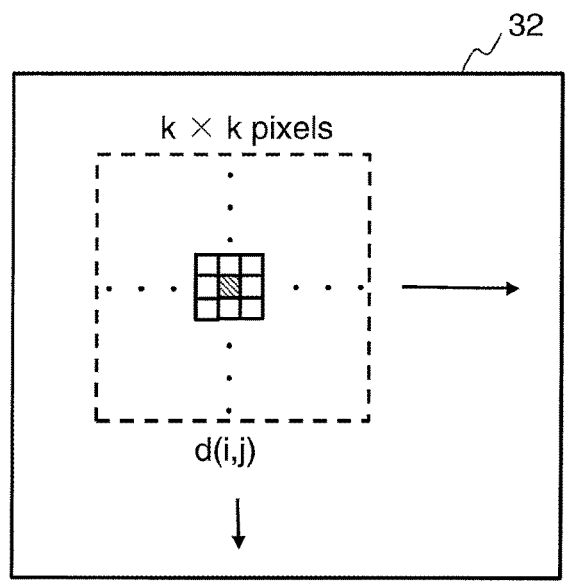

FIGS. 7A and 7B illustrate an example of a method for calculating a coefficient of a filter function according to the first embodiment. For example, as shown in FIG. 7A, an unknown coefficient matrix a(i,j) (an example of a coefficient) composed of k×k elements fewer than the number of pixels of one of a plurality of frame regions A to E is obtained. For example, a coefficient matrix a(i,j) of 15×15 is obtained for the image of each of the frame regions A to E each composed of 1024×1024 pixels. The coefficient matrix a(i,j) is calculated such that a value obtained by dividing a sum of products each between a pixel of k×k pixels of a developed image of each of the frame regions A to E centering a target pixel d(i,j) of the developed image concerned and a corresponding element of the coefficient matrix a (i, j) by the number of pixels, namely N(=k×k), becomes more closer to a target pixel r(i,j) of the frame image 30 (optical image) of a corresponding one of the frame regions A to E which is corresponding to the target pixel d(i, j). A relational expression (1) concerning the above is shown below.

$$\frac{\sum_{i,j=-k/2}^{k/2} a(i, j) \cdot d(i, j)}{N} = r(i, j) \quad (1)$$

As shown in FIG. 7B, with respect to each frame region 32 of a plurality of frame regions A to E, while moving a target pixel in the frame region 32 concerned, the relational expression (1) is calculated each time. Then, a coefficient matrix a(i,j) is calculated which most satisfies the relational expression (1) defined using the coefficient matrix a(i,j) individually obtained based on each of all the pixels in each of the frame regions A to E. The number of elements, k×k, of the coefficient matrix a(i,j) may be set appropriately. If the number of elements is small, the accuracy is degraded, and if too large, the operation time becomes long. Moreover, when a target pixel moves/shifts in each of the frame regions A to E, if the shifted position is close to an end of the frame region, there is a case where sufficient surrounding pixels do not exist at the end side around the target pixel. In such a case, calculation should be performed using surrounding pixels and the number of pixels, N, which make the calculation practical. Pixel data of the developed image can be read from the storage device 41. Pixel data of the frame image 30 can be read from the storage device 40.

Besides being stored in the storage device 39, the coefficient matrix a(i,j) (example of first coefficient) obtained as described above is output to the reference circuit 112 to be temporarily set as a filter function coefficient.

In the temporary reference image generation step (S114), for each of the frame regions A to E, the reference circuit 112 generates a temporary reference image (first temporary reference image) to be compared with the optical image of the frame region concerned, using the filter function in which a coefficient (first coefficient) calculated based on the data of the selected plurality of frame regions A to E is defined. Specifically, for each of the frame regions A to E, the reference circuit 112 performs filter processing on the developed image of the frame region concerned in order to generate a temporary reference image by using the obtained coefficient matrix a (i, j) (example of first coefficient). The generated temporary reference image is output to the comparison circuit 108 to be stored in the storage device 72.

In the comparison step (S116), for each of the frame regions A to E, the comparison circuit 108 compares a frame image (optical image) with a temporary reference image, for each pixel in both the images of the frame region concerned. First, for each of the frame regions A to E, the alignment unit 78 reads the frame image 30 (optical image) to be compared from the storage device 76, and a temporary reference image to be compared from the storage device 60. Then, positioning (alignment) is performed using a predetermined algorithm. For example, the positioning is performed using a least-squares method. The comparison processing unit 80 compares, for each pixel, the read frame image 30 with the read temporary reference image, and calculates a difference between pixel values (gradation (gray scale) values). For example, a difference value is calculated for each pixel by subtracting the pixel value of the frame image from the pixel value of the reference image.

In the determination step (S118), the determination unit 53 determines whether a maximum difference (maximum error) between pixel values of all the temporary reference images and pixel values of the corresponding frame images 30 of a plurality of frame regions A to E is equal to or less than a threshold Th.

Then, based on the determination result, if the maximum error between the pixel values of all the temporary reference images and the pixel values of the frame images of a plurality of frame regions A to E is not equal to or less than the threshold Th, it returns to the frame region selection step (S102). Then, each step from the frame region selection step (S102) to the determination step (S118) is repeated until the maximum error between the pixel values of all the temporary reference images and the pixel values of frame images of a plurality of frame regions A to E becomes equal to or less than the threshold Th in the determination step (S118).

If, based on the determination result, the maximum error between the pixel values of all the temporary reference images and the pixel values of the frame images of a plurality of frame regions A to E is equal to or less than the threshold Th, it goes to the difference calculation (1) step (S130). Next, it s determined whether a coefficient (first coefficient) calculated using data of a selected plurality of frame regions A to E is a suitable coefficient. Therefore, data of two reference frames 1 and 2, here the frame regions A and B, selected from a plurality of frame regions A to E is used. It will be explained below.

In the filter coefficient calculation step (S122), the filter coefficient calculation unit 45 (second coefficient calculation unit) calculates a coefficient (second coefficient) of a filter function for generating a reference image, by using data of the frame image 30 (optical image) of the frame region A (reference small region) used as the reference frame 1 selected from a plurality of frame regions A to E, and data of the developed image of the selected frame region A. Here, a group of coefficients (second coefficient) of a filter function are calculated for one frame region A of a plurality of frame regions A to E (small region) not for all of them. Specifically, the filter coefficient calculation unit 45 calculates a coefficient matrix a (i, j) of 15×15 for the image of the frame region A. The calculation method is the same as that of the filter coefficient calculation step (S112) except that the calculation range is limited to one frame region A instead of all of a plurality of frame regions A to E (small region).

In the temporary reference image generation step (S124), the reference circuit 112 generates a temporary reference image (second temporary reference image) to be compared with the optical image of the frame region A by using the filter function in which a coefficient (second coefficient) calculated based on the data of the selected reference frame 1 (frame region A) is defined. Specifically, the reference circuit 112 performs filter processing on the developed image of the frame region A concerned in order to generate a temporary reference image by using the obtained coefficient matrix a (i, j) (example of second coefficient). The generated temporary reference image is output to the comparison circuit 108 to be stored in the storage device 72.

In the comparison step (S126), the comparison circuit 108 compares a frame image (optical image) with a temporary reference image, for each pixel in both the images of the frame region A. First, the alignment unit 78 reads the frame image 30 (optical image) to be compared from the storage device 76, and reads a temporary reference image to be compared from the storage device 60. Then, positioning is performed using a predetermined algorithm. For example, the positioning is performed using a least-squares method. The comparison processing unit 80 compares, for each pixel, the read frame image 30 with the read temporary reference image, and calculates a difference between the pixel values (gradation values). For example, a difference value is calculated for each pixel by subtracting the pixel value of the frame image from the pixel value of the reference image.

In the determination step (S128), the determination unit 54 determines whether a maximum difference (maximum error) between the pixel value of a temporary reference image and the pixel value of a corresponding frame image 30 of the frame region A is equal to or less than the threshold Th.

Then, based on the determination result, if the maximum error between the pixel value of the temporary reference image and the pixel value of the frame image of the frame region A is not equal to or less than the threshold Th, there is a high probability of a defect being included in the frame region A. Therefore, it returns to the frame region selection step (S102). Then, each step from the frame region selection step (S102) to the determination step (S128) is repeated until the maximum error between the pixel value of the temporary reference image and the pixel value of the frame image of the frame region A becomes equal to or less than the threshold Th in the determination step (S128). Thus, a plurality of frame regions A to E are re-selected, and not only a group of coefficients (second coefficient) of the filter function calculated for the frame region A but also a group of coefficients (first coefficient) of the filter function calculated for a plurality of frame regions A to E is re-calculated.

If, based on the determination result, the maximum error between the pixel value of the temporary reference image and the pixel value of the frame image of the frame region A is equal to or less than the threshold Th, it goes to the difference calculation (1) step (S130).

In the difference calculation (1) step (S130), the difference calculation unit 56 calculates, for each pixel, a difference value between a temporary reference image (first temporary reference image) to be compared with the frame image 30 (optical image) of the frame region A (reference small region) generated using the filter function in which a group of coefficients (first coefficient) calculated for a plurality of frame regions A to E is defined, and a temporary reference image (second temporary reference image) to be compared with the frame image 30 (optical image) of the frame region A (reference small region) generated using the filter function in which a group of coefficients (second coefficient) calculated only for the frame region A is defined. For example, a difference value (1) is calculated for each pixel by subtracting the pixel value of the temporary reference image (second temporary reference image) of the frame region A (reference small region) generated using the filter function, in which a group of coefficients (second coefficient) calculated only for the frame region A is defined, from the pixel value of the temporary reference image (first temporary reference image) of the frame region A (reference small region) generated using the filter function in which a group of coefficients (first coefficient) calculated for a plurality of frame regions A to E is defined.

In the determination step (S132), the determination unit 58 determines, for each pixel, whether there exists a pixel for which a difference value (1), between the temporary reference image (first temporary reference image) of the frame region A (reference frame 1: reference small region) generated using the filter function in which a group of coefficients (first coefficient) calculated for a plurality of frame regions A to E is defined and the temporary reference image (second temporary reference image) of the frame region A (reference small region) generated using the filter function in which a group of coefficients (second coefficient) calculated only for the frame region A is defined, is larger than a threshold Th'. It is preferable that the threshold Th' is a gray scale around 10 to 40. For example, the gray scale 30 is used as the threshold Th'. If a pixel whose difference value (1) is larger than the threshold Th' exists, the determination result is output to the control computer 110, and it goes to the inspection stop processing step (S134). If a pixel whose difference value (1) is larger than the threshold Th' does not exist, it goes to the filter coefficient calculation step (S142).

In the inspection stop processing step (S134), based on the determination result, if a pixel whose difference value (1) is larger than the Th' exists, the control computer 110 (inspection control unit) beforehand stops the inspection processing for patterns in the inspection region 10. Then, it returns to the frame region selection step (S102).

Here, if a defect exists only in the frame regions other than the frame region A, a group of coefficients (first coefficient) calculated for a plurality of frame regions A to E greatly differs from a group of coefficients (second coefficient) calculated only for the frame region A (reference frame 1). Therefore, the difference value (1) (gradation difference) become large. In such a case, since it turns out that a defect exists in one, some, or all of the frame regions B to E other than the frame region A, an error is included in the group of coefficients (first coefficient) calculated for a plurality of frame regions A to E as a frame region used as the basis for calculating a coefficient of the filter function. Therefore, if the pattern inspection processing in the inspection region 10 is proceeded using that group of coefficients (first coefficient), it may highly cause generating a false defect. Thus, in such a case, the inspection itself is stopped in advance. Thereby, inspection using an unsuitable filter function coefficient can be obviated. Therefore, it is possible to avoid generating a false defect.

Here, if no defect is included in any of a plurality of frame regions A to E, when generating a reference image for the frame region A, the accuracy can be more increased by using a group of coefficients (second coefficient) calculated only for the frame region A. However, the difference value (1) is not so large with respect to a reference image generated using a group of coefficients (first coefficient) calculated for a plurality of frame regions A to E.

On the other hand, if a defect exists only in the frame region A, an error is of course included in a group of coefficients (second coefficient) calculated only for the frame region A, and the error is included also in a group of coefficients (first coefficient) calculated for a plurality of frame regions A to E. Consequently, the difference value (1) (gradation difference) may be larger than the threshold Th', or may be equal to or less than the threshold Th'. Therefore, in such a case, determination cannot be accomplished in the determination step (S132). Then, another reference frame 2 is used for determination.

Furthermore, if defects exist both in the frame region A and in the frame region other than the frame region A, an error is of course included in a group of coefficients (second coefficient) calculated only for the frame region A, and an error is included also in a group of coefficients (first coefficient) calculated for a plurality of frame regions A to E. Consequently, the difference value (1) (gradation difference) may be larger than the threshold Th', or may be equal to or less than the threshold Th'. Therefore, in such a case, determination cannot be accomplished in the determination step (S132).

In the filter coefficient calculation step (S142), the filter coefficient calculation unit 46 calculates a coefficient (third coefficient) of a filter function for generating a reference image, by using data of the frame image 30 (optical image) of the frame region B (reference small region) used as the reference frame 2 selected from a plurality of frame regions A to E, and data of a developed image of the selected frame region B. In this case, a group of coefficients (third coefficient) of a filter function is calculated not for all of a plurality of frame regions A to E (small region) but for one frame region B. Specifically, the filter coefficient calculation unit 46 calculates a coefficient matrix a(i,j) of 15×15 for the image of the frame region B. The calculation method is the same as that of the filter coefficient calculation step (S112) except that the calculation range is limited to one frame region B instead of all of a plurality of frame regions A to E (small region).

In the temporary reference image generation step (S144), the reference circuit 112 generates a temporary reference image (third temporary reference image) to be compared with the optical image of the frame region A by using the filter function in which a coefficient (third coefficient) calculated based on the data of the selected reference frame 2 (frame region B) is defined. Specifically, the reference circuit 112 performs filter processing on the developed image of the frame region B concerned in order to generate a temporary reference image by using the obtained coefficient matrix a(i,j) (example of second coefficient). The generated temporary reference image is output to the comparison circuit 108 to be stored in the storage device 72.

In the comparison step (S146), the comparison circuit 108 compares a frame image (optical image) with a temporary reference image, for each pixel in both the images of the frame region B. First, the alignment unit 78 reads the frame image 30 (optical image) to be compared from the storage device 76, and reads a temporary reference image to be compared from the storage device 60. Then, positioning (alignment) is performed using a predetermined algorithm. For example, the positioning is performed using a least-squares method. The comparison processing unit 80 compares, for each pixel, the read frame image 30 with the read temporary reference image, and calculates a difference between the pixel values (gradation values). For example, a difference value is calculated for each pixel by subtracting the pixel value of the frame image from the pixel value of the reference image.

In the determination step (S148), the determination unit 55 determines whether a maximum difference (maximum error) between the pixel value of a temporary reference image and the pixel value of a corresponding frame image 30 of the frame region B is equal to or less than the threshold Th.

Then, based on the determination result, if the maximum error between the pixel value of the temporary reference image and the pixel value of the frame image of the frame region B is not equal to or less than the threshold Th, there is a high probability of a defect being included in the frame region B. Therefore, it returns to the frame region selection step (S102). Then, each step from the frame region selection step (S102) to the determination step (S148) is repeated until the maximum error between the pixel value of the temporary reference image and the pixel value of the frame image of the frame region B becomes equal to or less than the threshold Th in the determination step (S148). Thus, a plurality of frame regions A to E are re-selected, and not only a group of coefficients (third coefficient) of the filter function calculated for the frame region B but also a group of coefficients (first coefficient) of the filter function calculated for a plurality of frame regions A to E is re-calculated.

If, based on the determination result, the maximum error between the pixel value of the temporary reference image and the pixel value of the frame image of the frame region B is equal to or less than the threshold Th, it goes to the difference calculation (2) step (S150).

In the difference calculation (1) step (S130), the difference calculation unit 57 calculates, for each pixel, a difference value (2) between a temporary reference image (first temporary reference image) to be compared with the frame image 30 (optical image) of the frame region B (reference small region) generated using the filter function in which a group of coefficients (first coefficient) calculated for a plurality of frame regions A to E is defined, and a temporary reference image (third temporary reference image) to be compared with the frame image 30 (optical image) of the frame region B (reference small region) generated using the filter function in which a group of coefficients (third coefficient) calculated only for the frame region B is defined. For example, the difference value (2) is calculated for each pixel by subtracting the pixel value of the temporary reference image (third temporary reference image) of the frame region B (reference small region) generated using the filter function, in which a group of coefficients (third coefficient) calculated only for the frame region B is defined, from the pixel value of the temporary reference image (first temporary reference image) of the frame region B (reference small region) generated using the filter function in which a group of coefficients (first coefficient) calculated for a plurality of frame regions A to E is defined.

In the determination step (S152), the determination unit 59 determines, for each pixel, whether there exists a pixel for which a difference value (2), between the temporary reference image (first temporary reference image) of the frame region B (reference frame 2: reference small region) generated using the filter function in which a group of coefficients (first coefficient) calculated for a plurality of frame regions A to E is defined and the temporary reference image (third temporary reference image) of the frame region B (reference small region) generated using the filter function in which a group of coefficients (third coefficient) calculated only for the frame region B is defined, is larger than a threshold Th'. It is preferable that the threshold Th' is a gray scale around 10 to 40. For example, the gray scale 30 is used as the threshold Th'. If a pixel whose difference value (2) is larger than the threshold Th' exists, the determination result is output to the control computer 110, and it goes to the inspection stop processing step (S134). In the inspection stop processing step (S134), based on the determination result, if a pixel whose difference value (2) is larger than the Th' exists, the control computer 110 (inspection control unit) beforehand stops the inspection processing for patterns in the inspection region 10. Then, it returns to the frame region selection step (S102).

On the other hand, if a pixel whose difference value (2) is larger than the threshold Th' does not exist, a group of coefficients (first coefficient) calculated for a plurality of frame regions A to E is stored in the storage device 39, and output as a filter coefficient for inspection to the reference circuit 112.

Here, if a defect exists in the frame region B, an error is of course included in a group of coefficients (third coefficient) calculated only for the frame region B, and the error is included also in a group of coefficients (first coefficient) calculated for a plurality of frame regions A to E. Consequently, the difference value (2) (gradation difference) may be larger than the threshold Th', or may be equal to or less than the threshold Th'. However, calculation of the group of coefficients (third coefficient) for the frame region B is performed in the case where a defect exists only in the frame region A, where no defect is included in any of a plurality of frame regions A to E, or where defects exist in both the frame region A and the frame region other than the frame region A. It is generally unlikely that defects exist in both the two frame regions A and B selected as the reference frames 1 and 2 from a plurality of selected frame regions A to E. Therefore, according to the first embodiment, even if comparison is performed using the data of the two reference frames 1 and 2, when both the comparison results are suitable, it is presumed that the group of coefficients (first coefficient) calculated for a plurality of frame regions A to E is a suitable coefficient group. However, it is not limited thereto, and it is also preferable to set the number of reference frames to be three or more, and to repeat steps being the same as those (from the filter coefficient calculation step (S142) to the determination step (S152)) of the case of the frame region B.

Figure 8:
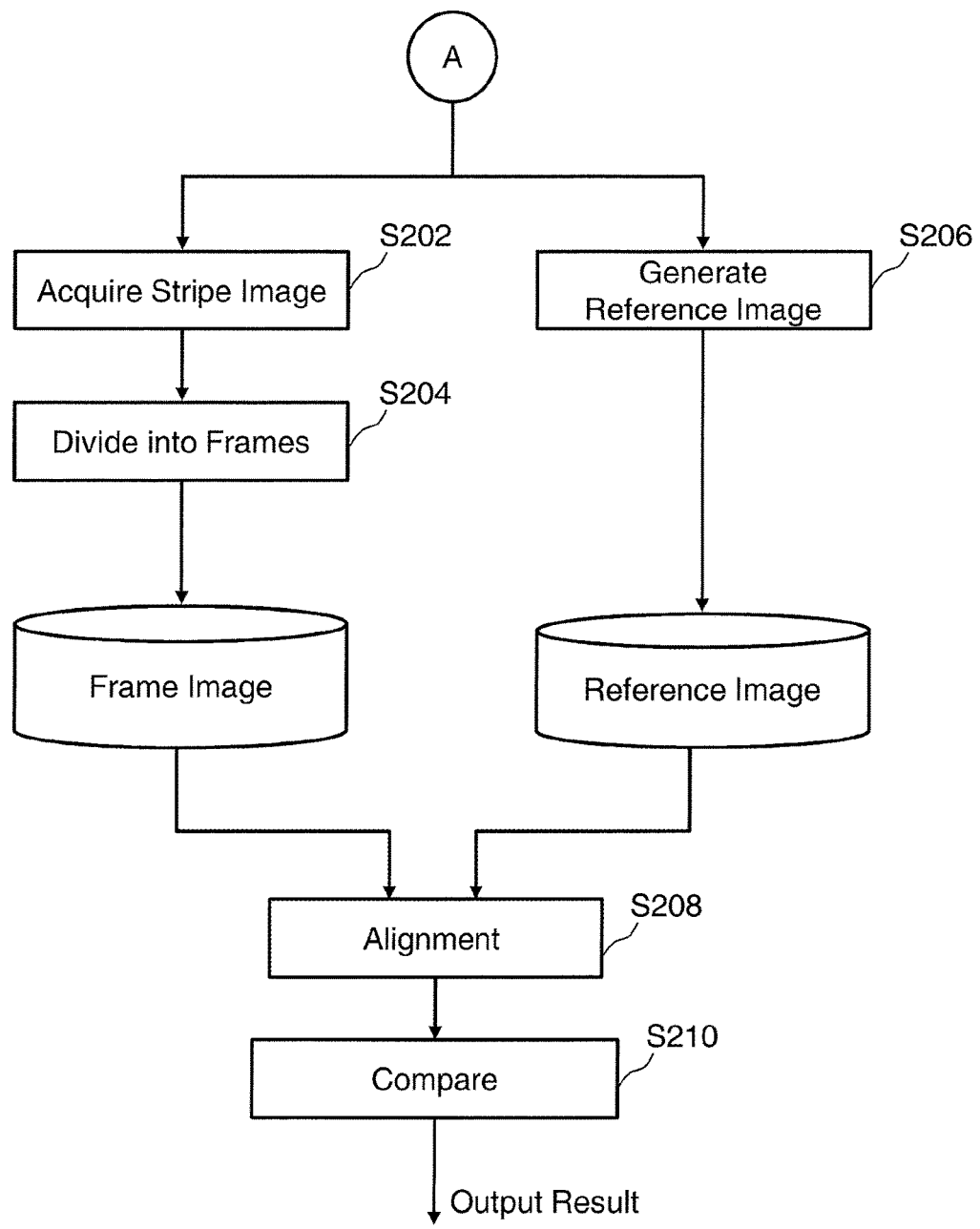
FIG. 8 is a flowchart showing the rest of the main steps of the pattern inspection method according to the first embodiment.

FIG. 8 is a flowchart showing the rest of the main steps of the pattern inspection method according to the first embodiment. In FIG. 8, the rest of the pattern inspection method according to the first embodiment executes, subsequent to the determination step (S152), a series of steps: a stripe image acquisition step (S202), a frame division step (S204), a reference image generation step (S206), a positioning step (S208), and a comparison step (S210). In the flow of FIG. 8, actual inspection processing is performed using the filter coefficient obtained by the flow of FIG. 6.

In the stripe image acquisition step (S202), the optical image acquisition mechanism 150 acquires an optical image in the inspection region 10 of the substrate 101. The optical image acquisition mechanism 150 acquires an optical image for each inspection stripe 20. The method for acquiring a stripe image is the same as that described above. However, here, a plurality of stripe images shown in FIG. 2 are acquired in order. Usually, all the stripe images are acquired in order. However, as to the inspection stripe 20 concerning which it is known that no figure pattern is arranged therein, scan processing may be omitted. Then, pixel data is stored in the stripe pattern memory 123, for each inspection stripe 20. Then, the stripe region image is transmitted, with data indicating the position of the substrate 101 on the XYθ table 102 output from the position circuit 107, to the comparison circuit 108. Measurement data (pixel data) is 8-bit unsigned data, for example, and indicates a gray level (light intensity) of brightness of each pixel. The stripe region image input into the comparison circuit 108 is stored in the storage device 70.

In the frame division step (S204), in the comparison circuit 108, the division unit 74 divides, for each inspection stripes 20, a stripe region image (optical image) into a plurality of frame images 30 (optical image) by a predetermined size (for example, the same width as the scan width W) in the x direction. For example, it is divided into frame images each having 1024×1024 pixels. In other words, the stripe region image of each inspection stripe 20 is divided into a plurality of frame images 30 (optical image) by the same width as that of the inspection stripe 20, e.g., the scan width W. By this processing, a plurality of frame images 30 (optical image) corresponding to a plurality of frame regions are acquired. A plurality of frame images 30 are stored in the storage device 76. By what is described above, image (measured image) data of one side to be compared for inspection is generated.

In the reference image generation step (S206), for each frame region (inspection unit region) of the frame region size (predetermined size), a reference image generation unit generates a reference image by using a filter function in which a group of coefficients (first coefficient) calculated for a plurality of frame regions A to E is defined. Specifically, it operates as follows: The development circuit 111 (developed image generation unit, and a part of reference image generation unit) generates a developed image by performing image development based on design pattern data used as a basis of pattern formation of the inspection substrate 101 described above. Then, using one coefficient matrix a(i,j) (example of filter coefficient) calculated for a plurality of frame regions A to E, the reference circuit 112 (another part of reference image generation unit) performs filter processing on the developed image of each frame region in order to generate a reference image. The generated reference image of each frame region is output to the comparison circuit 108 to be stored in the storage device 72.

Then, for each frame region (inspection unit region) of the frame region size (predetermined size), the comparison circuit 108 inspects a pattern in the inspection region 10 by using a reference image generated based on a filter function in which a group of coefficients (first coefficient) calculated for a plurality of frame regions A to E is defined. Specifically, it operates as follows:

In the positioning step (S208), the alignment unit 78 reads a frame image (optical image) to be compared from the storage device 76, and a reference image to be compared from the storage device 72. Then, positioning is performed using a predetermined algorithm. For example, the positioning is performed using a least-squares method.

In the comparison step (S210), the comparison processing unit 80 (comparison unit) compares an optical image with a reference image, for each frame region (inspection unit region). In other words, for each of a plurality of frame regions (small region), the comparison processing unit 80 compares, for each pixel, a frame image (optical image) with a reference image corresponding to the frame image concerned of the frame region concerned in order to inspect a pattern defect. The comparison processing unit 80 compares both the images, for each pixel, according to a predetermined condition, and determines whether there is a defect, such as a shape defect. For example, the comparison processing unit 80 compares both the images, for each pixel, according to a determination condition, such as a predetermined algorithm, in order to determine whether a defect exists or not. For example, a difference value is calculated by, for each pixel, subtracting the pixel value of a frame image from the pixel value of a reference image, and then, if the difference value is larger than a threshold Th, it is determined to be a defect. Then, the comparison result is output to a magnetic disk device 109, magnetic tape device 115, flexible disk device (FD) 116, CRT 117, and pattern monitor 118, or output from the printer 119.

As described above, according to the first embodiment, a suitable filter coefficient (or a value more suitable than the one obtained by a conventional method) can be obtained, and therefore, the accuracy of filter processing can be increased. Thus, the generation accuracy of a reference image can be increased. Consequently, it is possible to perform pattern defect inspection with great precision, thereby increasing the inspection accuracy.

In other words, according to the first embodiment, inspection using an unsuitable filter function coefficient can be obviated. Therefore, generation of a false defect can be prevented. Consequently, it is possible to increase the inspection accuracy.

Second Embodiment

In the first embodiment, a method has been described in which whether a filter coefficient calculated using a plurality of frame regions is suitable is determined based on data of some of a plurality of frame regions for calculating the filter coefficient. In a second embodiment, a method will be described in which is determined whether a filter coefficient calculated when the pattern type formed in the frame region (one or two or more frame regions) for calculating the filter coefficient is a specific pattern type is suitable.

Figure 9:
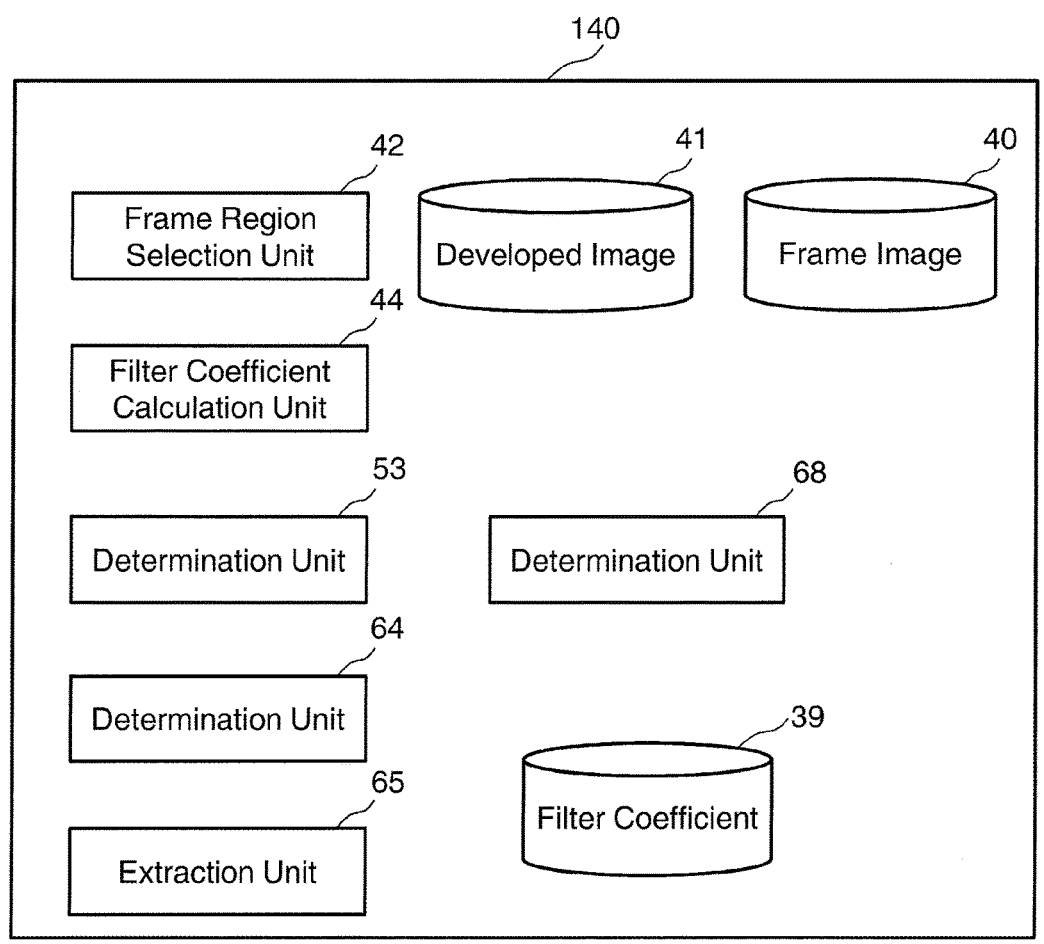
FIG. 9 shows an example of an internal configuration of a filter calculation circuit according to a second embodiment.

FIG. 9 shows an example of an internal configuration of a filter calculation circuit according to the second embodiment. FIG. 9 is the same as FIG. 3 except that, in the filter calculation circuit 140, there are arranged a determination unit 64, an extraction unit 65, and a determination unit 68 instead of the reference frame selection unit 43, the filter coefficient calculation unit 45, the filter coefficient calculation unit 46, the determination unit 54, the determination unit 55, the difference calculation unit 56, the difference calculation unit 57, the determination unit 58, and the determination unit 59. Each " . . . unit" such as the frame region selection unit 42, the filter coefficient calculation units 44, the determination unit 53, the determination unit 64, the extraction unit 65, and the determination unit 68 includes a processing circuitry. As the processing circuitry, for example, an electric circuit, computer, processor, circuit board, quantum circuit, or semiconductor device may be used. Each of the "circuits" may use a common processing circuitry (same processing circuitry), or different processing circuitries (separate processing circuitries). Input data required in the frame region selection unit 42, the filter coefficient calculation unit 44, the determination unit 53, the determination unit 64, the extraction unit 65, and the determination unit 68, and calculated results are stored in a memory (not shown) each time.

The configuration of the inspection apparatus 100 is the same as that of FIG. 1 except for the internal configuration of the filter calculation circuit 140 shown in FIG. 9. The contents of the present embodiment are the same as those of the first embodiment except what is specifically described below.

Figure 10:
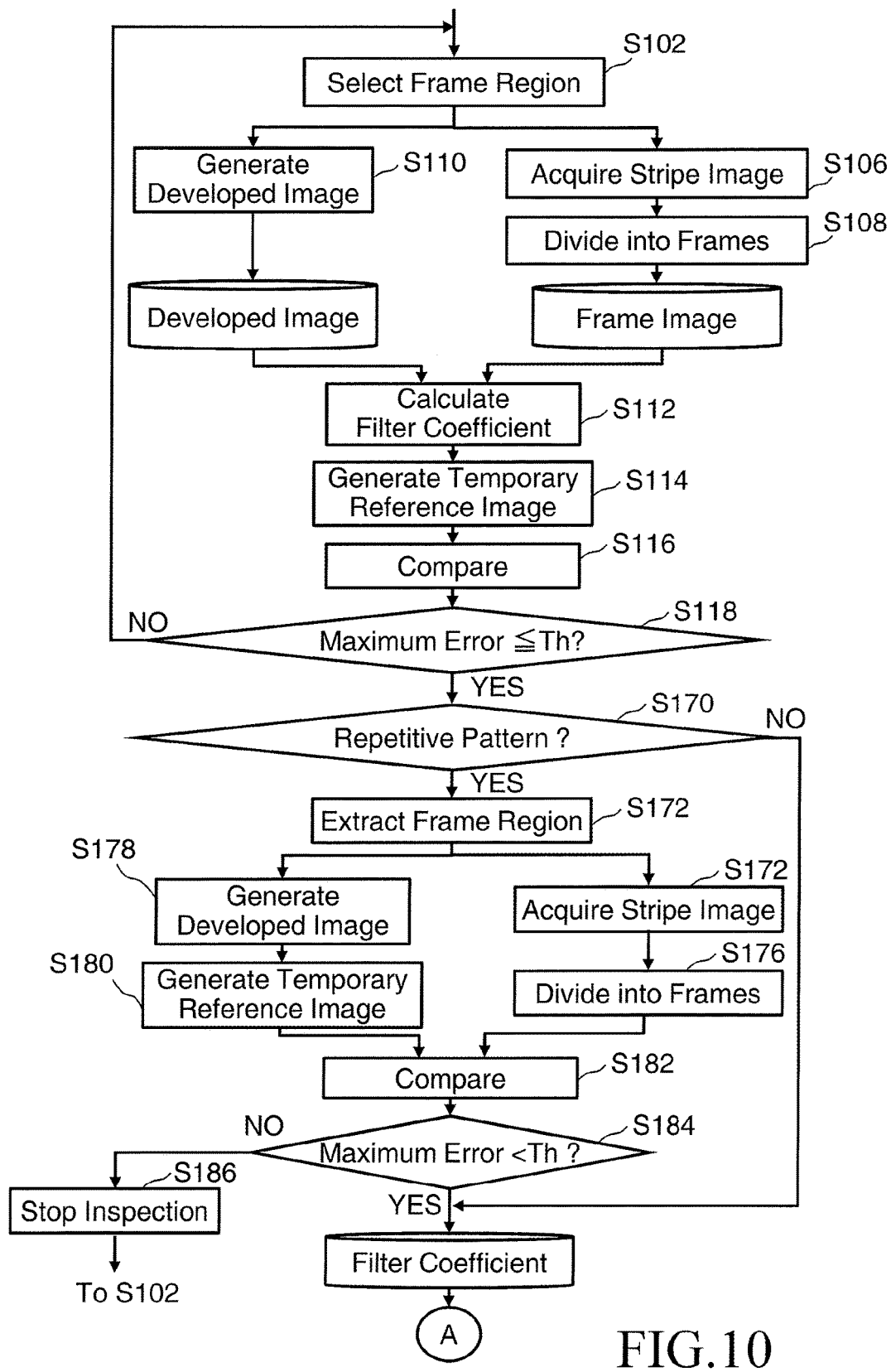
FIG. 10 is a flowchart showing some of main steps of a pattern inspection method according to the second embodiment.

FIG. 10 is a flowchart showing some of main steps of a pattern inspection method according to the second embodiment. In FIG. 10, some part of the pattern inspection method of the second embodiment executes a series of steps: a frame selection step (S102), a stripe image acquisition step (S106), a frame division step (S108), a developed image generation step (S110), a filter coefficient calculation step (S112), a temporary reference image generation step (S114), a comparison step (S116), a determination step (S118), a determination step (S170), a frame region extraction step (S172), a stripe image acquisition step (S174), a frame division step (S176), a developed image generation step (S178), a temporary reference image generation step (S180), a comparison step (S182), a determination step (S184), and an inspection stop processing step (S186). The series of steps shown in FIG. 10 is also an example of a filter coefficient acquisition method.

The contents of the frame selection step (S102), stripe image acquisition step (S106), frame division step (S108), developed image generation step (S110), filter coefficient calculation step (S112), temporary reference image generation step (S114), comparison step (S116), and determination step (S118) are the same as those of the first embodiment.

In the frame selection step (S102), a plurality of frame regions A to E may be selected, or one frame region (for example, frame region A) may be selected. In the case of selecting one frame region A, it goes without saying that the stripe image acquisition step (S106), frame division step (S108), developed image generation step (S110), filter coefficient calculation step (S112), temporary reference image generation step (S114), comparison step (S116), and determination step (S118) are executed with respect to the one frame region A.

In the case of selecting a plurality of frame regions A to E, in the filter coefficient calculation step (S112), the filter coefficient calculation unit 44 calculates a coefficient of a filter function for generating a reference image, by using data of the optical image of each of the frame regions A to E (first small region) each having the frame region size (predetermined size) selected from the inspection regions 10 of the inspection substrate 101 on which a plurality of figure patterns are formed, and data of each developed image generated by performing image development of a pattern arranged in each of the frame regions A to E (first small region) based on design data serving as a basis for forming a plurality of figure patterns on the substrate 101 to be inspected.

Alternatively, in the case of selecting one frame region A, in the filter coefficient calculation step (S112), the filter coefficient calculation unit 44 calculates a coefficient of a filter function for generating a reference image, by using data of an optical image of the frame region A (first small region) having the frame region size (predetermined size) selected from the inspection regions 10 of the inspection substrate 101 on which a plurality of figure patterns are formed, and data of a developed image generated by performing image development of a pattern arranged in the frame region A (first small region) based on design data serving as a basis for forming a plurality of figure patterns on the substrate 101 to be inspected.

In the determination step (S170), the determination unit 64 determines whether the pattern arranged in the selected frame region (first small region) is a repetitive pattern. Specifically, if the determination result of the determination step (S118) is that the maximum error between the pixel value of the temporary reference image and the pixel value of the frame image of all of a plurality of frame regions A to E selected in the frame selection step (S102) (or one frame region A selected in the frame selection step (S102) is equal to or less than the threshold Th, the determination unit 64 determines whether a pattern in each of the selected plurality of frame regions A to E (or in the selected one frame region A) is a repetitive pattern. As examples of the repetitive pattern, there are mentioned: a line and space pattern, an array pattern composed of rectangular patterns, etc.

With respect to frame regions in which repetitive patterns of the same size and pitch are arranged, their calculated filter coefficients are the same value. Even with respect to frame regions in which repetitive patterns not having the same size and pitch but having the same type such as line and space patterns are arranged, their calculated filter coefficients are similar/close values. Therefore, if the calculated coefficient is applied to another frame region in which a repetitive pattern having the same type is arranged, a reference image quality-wise close to a frame image (optical image) should be able to be generated. Then, according to the second embodiment, whether a calculated filter coefficient is suitable or unsuitable is determined by applying a calculated coefficient to another frame region in which a repetitive pattern of the same type is arranged.

If patterns in all of the selected plurality of frame regions A to E (or in the selected one frame region A) are repetitive patterns, it goes to the frame region extraction step (S172). If patterns in any of the selected plurality of frame regions A to E (or in the selected one frame region A) are not repetitive patterns, the filter coefficient calculated in the filter coefficient calculation step (S112) is, as a suitable coefficient, stored in the storage device 39, and output to the reference circuit 112.

In the frame region extraction step (S172), when patterns in all of the selected plurality of frame regions A to E (or in the selected one frame region A) (first small region) are repetitive patterns, the extraction unit 65 extracts, in the inspection region 10, another frame region F (second small region), being different from the selected plurality of frame regions A to E (or the selected one frame region A) (first small region), in which a repetitive pattern of the same type as the type of patterns in the selected plurality of frame regions A to E is arranged.

In the stripe image acquisition step (S174), the optical image acquisition mechanism 150 acquires an optical image of the extracted frame region F (second small region). The method for acquiring an optical image is the same as that of the stripe image acquisition step (S106).

In the frame division step (S176), the division unit 74 specifies the frame region F concerned (second small region)

based on extraction information extracted by the extraction unit 65. The division unit 74 divides a stripe region image by a predetermined size (for example, the same width as the scan width W) in the x direction such that the frame region F concerned (second small region) is clipped from the stripe region image (optical image) of an image-captured inspection stripe 20. For example, it is divided into frame images each having 1024×1024 pixels. Besides being stored in the storage device 76, image data of the clipped-out frame region F is output to the filter calculation circuit 140 to be stored in the storage device 40 in the filter calculation circuit 140.

In the developed image generation step (S178), the development circuit 111 specifies the frame region F concerned (second small region) based on extraction information extracted by the extraction unit 65. Then, the development circuit 111 generates a developed image by performing image development of a pattern arranged in the extracted frame region F concerned (second small region), based on design data used as a basis for forming a plurality of figure patterns on the substrate 101 to be inspected. The method for generating a developed image is the same as that of the developed image generation step (S110).

In the temporary reference image generation step (S180), the reference circuit 112 generates a temporary reference image (another example of second temporary reference image) to be compared with the optical image of the frame region F, using the filter function in which a coefficient (first coefficient) calculated based on the data of all of the selected plurality of frame regions A to E (or selected one frame region A) (first small region) is defined. Specifically, the reference circuit 112 performs filter processing on the developed image of the frame region F concerned in order to generate a temporary reference image by using the obtained coefficient matrix a(i,j) (example of first coefficient). The generated temporary reference image is output to the comparison circuit 108 to be stored in the storage device 72.

In the comparison step (S182), the comparison circuit 108 compares a frame image (optical image) with a temporary reference image, for each pixel in both the images of the frame region F. First, the alignment unit 78 reads the frame image 30 (optical image) to be compared from the storage device 76, and a temporary reference image to be compared from the storage device 60. Then, positioning is performed using a predetermined algorithm. For example, the positioning is performed using a least-squares method. The comparison processing unit 80 compares, for each pixel, the read frame image 30 with the read temporary reference image, and calculates a difference between pixel values (gradation (gray scale) values). For example, a difference value is calculated for each pixel by subtracting the pixel value of the frame image from the pixel value of the reference image.

In the determination step (S184), the determination unit 68 determines, for each pixel, whether there exists a pixel for which a difference, between data of the frame image (optical image) of the frame region F (second small region) and data of the reference image of the frame region F (second small region) generated using a filter function in which a calculated coefficient is defined, is larger than the threshold Th. If a pixel whose difference value is larger than the threshold Th exists, the determination result is output to the control computer 110, and it goes to the inspection stop processing step (S186). If a pixel whose difference value is larger than the threshold Th does not exist, the calculated filter coefficient is, as a suitable coefficient, stored in the storage device 39, and output to the reference circuit 112.

In the inspection stop processing step (S186), based on the determination result, if a pixel whose difference value is larger than the Th exists, the control computer 110 (inspection control unit) beforehand stops the inspection processing for patterns in the inspection region 10. Then, it returns to the frame region selection step (S102).

It is possible to determine that the filter coefficient is suitable if a reference image whose difference value is equal to or less than the threshold Th can be generated even when the filter coefficient is applied to the frame region F where a repetitive pattern is arranged whose type is the same as that of the pattern arranged in the frame region (for example, frame region A) used as the basis for calculating the filter coefficient. On the other hand, if a reference image whose difference value is larger than the threshold Th is generated when the filter coefficient is applied to the frame region F where a repetitive pattern is arranged whose type is the same as that of the pattern arranged in the frame region used as the basis for calculating the filter coefficient, there is a high probability that a defect is included in the frame region serving as the basis for calculating the filter coefficient. Therefore, if the pattern inspection processing in the inspection region 10 is proceeded using that group of coefficients (first coefficient), it may highly cause generating a false defect. Thus, in such a case, the inspection itself is stopped in advance. Thereby, inspection using an unsuitable filter function coefficient can be obviated. Therefore, it is possible to avoid generating a false defect.

The contents of each step after the stripe image acquisition step (S202) shown in FIG. 8 are the same as those in the first embodiment.

As described above, according to the second embodiment, similarly to the first embodiment, inspection using an unsuitable filter function coefficient can be obviated. Therefore, it is possible to avoid generating a false defect. Thus, the inspection accuracy can be increased.

Third Embodiment

In the first and second embodiments described above, the cases have been explained in which a defect is included in the frame region used as a basis for calculating a filter coefficient, and in which a method for reselecting a frame region is arbitrarily adopted. In a third embodiment, a method will be described in which a frame region is efficiently reselected when a defect is included in the frame region used as the basis for calculating the filter coefficient.

Figure 11:
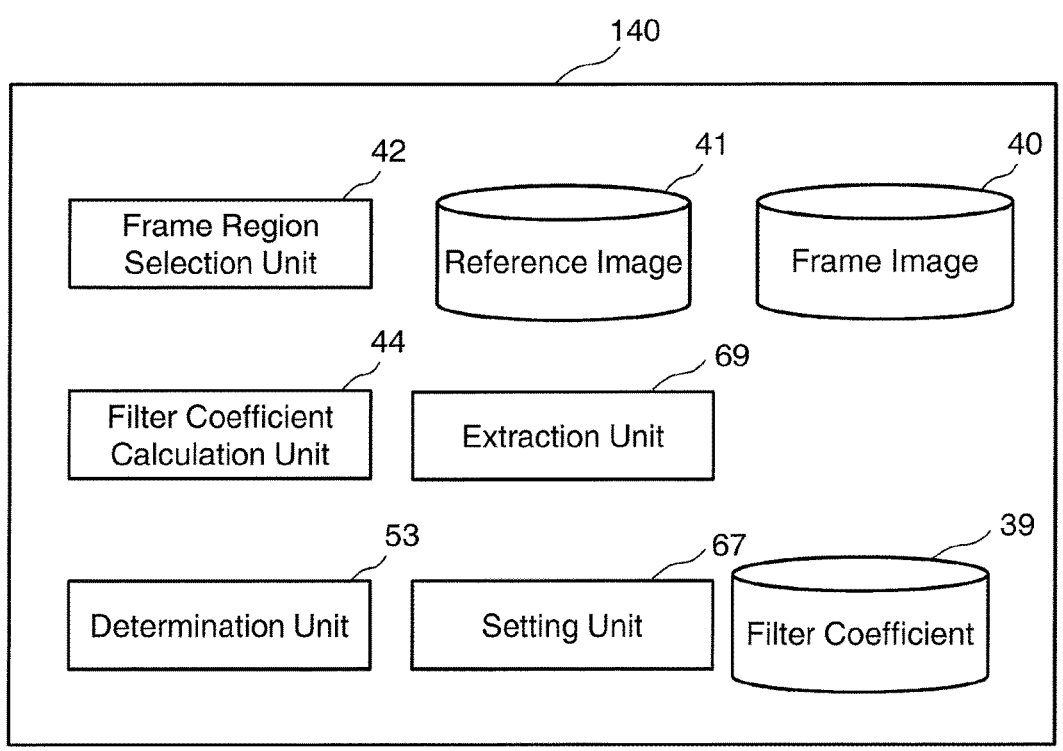
FIG. 11 shows an example of an internal configuration of a filter calculation circuit according to a third embodiment.

FIG. 11 shows an example of an internal configuration of a filter calculation circuit according to the third embodiment. FIG. 11 is the same as FIG. 3 except that, in the filter calculation circuit 140, there are arranged a setting unit 67 and an extraction unit 69 instead of the reference frame selection unit 43, the filter coefficient calculation unit 45, the filter coefficient calculation unit 46, the determination unit 54, the determination unit 55, the difference calculation unit 56, the difference calculation unit 57, the determination unit 58, and the determination unit 59. Each " . . . circuit" such as the frame region selection unit 42, filter coefficient calculation units 44, determination unit 53, setting unit 67 and extraction unit 69 includes a processing circuitry. As the processing circuitry, for example, an electric circuit, computer, processor, circuit board, quantum circuit, or semiconductor device may be used. Each of the "circuits" may use a common processing circuitry (same processing circuitry), or different processing circuitries (separate processing circuitries). Input data required in the frame region selection unit 42, filter coefficient calculation unit 44, determination unit 53, setting unit 67 and extraction unit 69, and calculated results are stored in a memory (not shown) each time.

The configuration of the inspection apparatus 100 is the same as that of FIG. 1 except for the internal configuration of the filter calculation circuit 140 shown in FIG. 11. The contents of the present embodiment are the same as those of the first embodiment except what is specifically described below.

Figure 12:
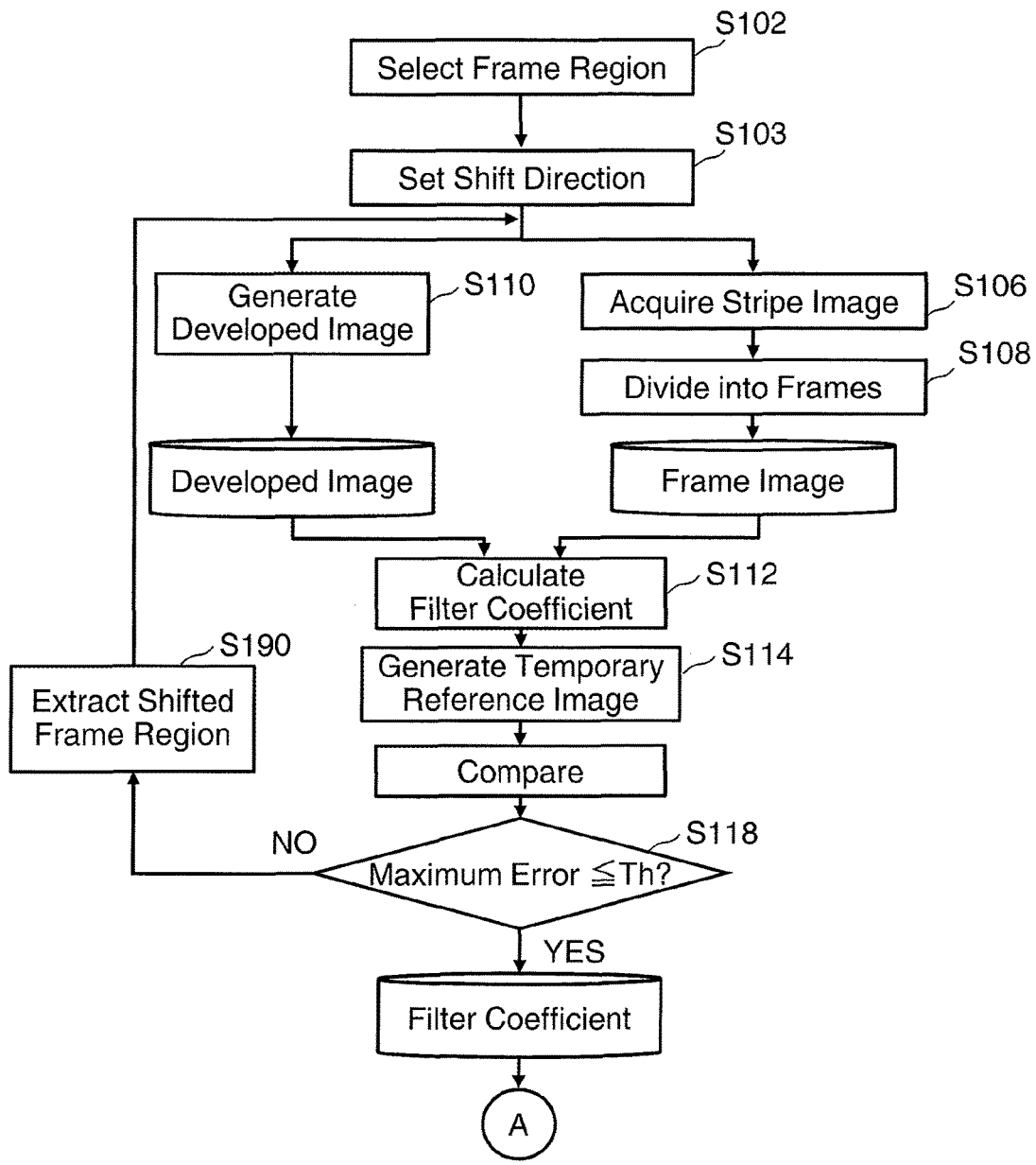
FIG. 12 is a flowchart showing some of main steps of a pattern inspection method according to the third embodiment.

FIG. 12 is a flowchart showing some of main steps of a pattern inspection method according to the third embodiment. In FIG. 12, some part of the pattern inspection method of the third embodiment executes a series of steps: the frame selection step (S102), a shift direction setting step (S103), the stripe image acquisition step (S106), the frame division step (S108), the developed image generation step (S110), the filter coefficient calculation step (S112), the temporary reference image generation step (S114), the comparison step (S116), the determination step (S118), and a shifted frame region extraction step (S190). The series of steps shown in FIG. 12 is also an example of a filter coefficient acquisition method.

In the frame selection step (S102), the frame region selection unit 42 selects a frame region G (small region) for calculating a filter coefficient from the inspection regions 10 of the substrate 101 to be inspected. Here, not a plurality of frame regions A to E but one frame region G is selected. The other contents are the same as those of the first embodiment.

In the shift direction setting step (S103), the setting unit 67 sets an oblique direction for shifting a frame region. For example, four directions of a +x and +y direction (upper right direction: 45 degree direction), a +x and −y direction (lower right direction: −45 degree (315 degree) direction, a −x and +y direction (upper left direction: 135 degree direction), and a −x and −y direction (lower left direction: 225 degree direction) can be the oblique direction. Although here the angle is shifted by 45 degrees, it is not limited to 45 degrees as long as an oblique direction. However, a natural number multiple of 45 degrees is preferable because it can make the shift amount (movement amount) minimum.

The contents of the stripe image acquisition step (S106), frame division step (S108), developed image generation step (S110), filter coefficient calculation step (S112), temporary reference image generation step (S114), comparison step (S116), and determination step (S118) are the same as those of the first embodiment.

In the case of selecting one frame region G, it goes without saying that the stripe image acquisition step (S106), frame division step (S108), developed image generation step (S110), filter coefficient calculation step (S112), temporary reference image generation step (S114), comparison step (S116), and determination step (S118) are executed with respect to the one frame region G.

Therefore, in the case of selecting the one frame region G, in the filter coefficient calculation step (S112), the filter coefficient calculation unit 44 calculates a coefficient (first coefficient) of a filter function for generating a reference image, by using data of an optical image of the frame region G (first small region) having the frame region size (predetermined size) selected from the inspection regions 10 of the inspection substrate 101 on which a plurality of figure patterns are formed, and data of a developed image generated by performing image development of a pattern arranged in the frame region G (first small region) based on design data used as a basis for forming a plurality of figure patterns on the substrate 101 to be inspected.

In the determination step (S118), the determination unit 53 determines, for each pixel, whether there exists a pixel for which a difference, between data of the frame image (optical image) of the frame region G (first small region) and data of the reference image of the frame region G (first small region) generated using a filter function in which a calculated coefficient (first coefficient) is defined, is larger than the threshold Th. If a pixel whose difference value is larger than the threshold Th does not exist, the calculated filter coefficient is, as a suitable coefficient, stored in the storage device 39, and output to the reference circuit 112. If a pixel whose difference value is larger than the threshold Th exists, there is a high probability that a defect is included in the frame region G. Then, according to the third embodiment, efficient searching is performed to find a frame region where no defect is included. Thus, when a pixel whose difference value is larger than the threshold Th exists, it goes to the shifted frame region extraction step (S190).

In the shifted frame region extraction step (S190), when determined that a pixel whose difference value is larger than the threshold Th exists, the extraction unit 69 extracts a frame region H (second small region) of the frame region size (predetermined size) at a position shifted in the oblique direction from the frame region G (first small region).

Figure 13:
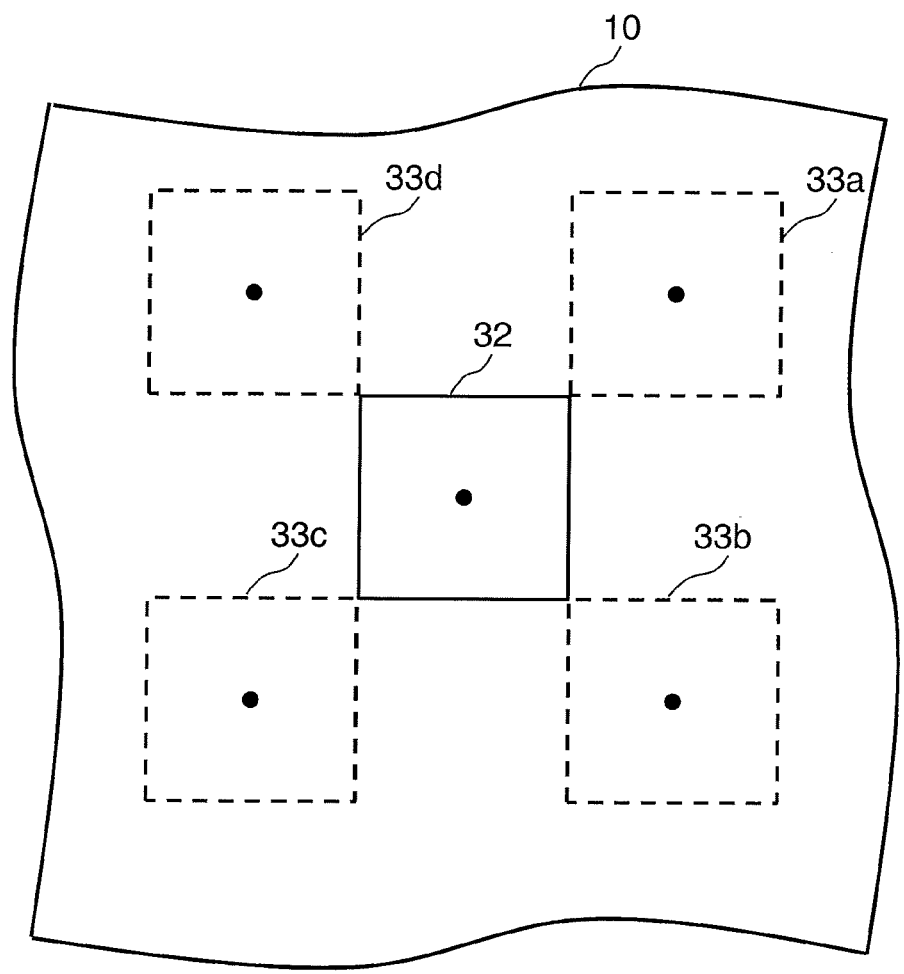
FIG. 13 illustrates a method for extracting a shifted frame region according to the third embodiment.

FIG. 13 illustrates a method for extracting a shifted frame region according to the third embodiment. In FIG. 13, extraction is performed from four frame regions 33a to 33d in the inspection region 10 which have been shifted in oblique directions from the frame region 32 (frame region G) used in the filter coefficient calculation step (S112). Here, the frame region H (second small region) located in the direction having been already set is extracted. For example, the frame region 33a which is shifted in the 45 degree direction is extracted. If a defect occurs, it is usually the size of one to several pixels. Therefore, when distant from a defect by 1024×1024 pixels or more, no influence is given by the defect concerned. However, for example, if defects are accidentally repeatedly included only in design data used for writing (or if the writing apparatus which writes a pattern on the substrate 101 repeatedly gives defects due to false recognition), the defects may repeatedly appear in up-and-down and right-and-left directions basically. Therefore, defect inclusion probability can be less when shifting in an oblique direction as in the third embodiment than that in the case of shifting in up-and-down and right-and-left directions. However, even when shifting in an oblique direction, if a frame region overlapping with the frame region 32 (frame region G) including a defect is extracted, the extracted frame region may also include the defect. Therefore, a frame region should preferably be extracted not to overlap with the frame region 32 (frame region G) including a defect. Furthermore, it is preferable to extract the frame region 33a being adjacent in the oblique direction. Thereby, the shift amount (movement amount) can be decreased. Moreover, in the case of shifting by the angle other than a natural number multiple of 45 degrees, when needing to avoid a region which may include a defect appearing in up-and-down and right-and-left directions, the shift amount (movement amount) becomes larger than the amount in shifting by the angle of a natural number multiple of 45 degrees. Therefore, it is more preferable to perform shifting by the angle of a natural number multiple of 45 degrees.

Then, it returns to the stripe image acquisition step (S106), and, the steps of stripe image acquisition step (S106), frame division step (S108), developed image generation step (S110), filter coefficient calculation step (S112), temporary reference image generation step (S114), comparison step (S116), and determination step (S118) are repeatedly performed for the shifted frame region (in this case, frame region H) (second small region) until it becomes a situation where a pixel whose difference value is larger than the threshold Th does not exist in the determination step (S118).

In the filter coefficient calculation step (S112), based on the determination result, if a pixel whose difference value is larger than a threshold value exists, the filter coefficient calculation unit 44 calculates a coefficient (second coefficient) of the filter function for generating a reference image by using data of the optical image of the frame region H (second small region) having the frame size at the position shifted in the oblique direction from the frame region G (first small region), and data of a developed image generated by performing image development of the pattern arranged in the frame region H (second small region).

Then, a filter coefficient calculated based on data of a frame region which is determined in the determination step (S118) to include no pixel whose difference value is larger than the threshold Th is as a suitable coefficient stored in the storage device 39, and output to the reference circuit 112. In other words, when determined in the determination step (S118) that a pixel whose difference value in the original frame region G (first small region) is larger than the threshold Th does not exist, a filter coefficient (first coefficient) calculated based on the frame region G (first small region) is to be used. If there exists a pixel whose difference value in the original frame region G (first small region) is larger than the threshold Th, a filter coefficient (second coefficient) calculated based on the frame region H (second small region) at the position obliquely shifted is to be used.

If a reference image whose difference value is larger than the threshold Th is generated even when the filter coefficient (first coefficient) calculated based on the frame region G (first small region) is used, there is a high probability that a defect is included in the frame region G serving as the basis for calculating the filter coefficient. Therefore, if the pattern inspection processing in the inspection region 10 is proceeded using that group of coefficients (first coefficient), it may highly cause generating a false defect. Thus, in such a case, a group of suitable coefficients (second coefficient) is efficiently obtained before executing the inspection itself. Thereby, inspection using an unsuitable filter function coefficient can be obviated. Therefore, it is possible to avoid generating a false defect.

The contents of each step after the stripe image acquisition step (S202) shown in FIG. 8 are the same as those in the first embodiment.

Therefore, when determined in the determination step (S118) that a pixel whose difference value in the original frame region G (first small region) is larger than the threshold Th does not exist, the reference image generated in order to inspect patterns in the inspection region 10 is generated using the filter function in which a filter coefficient (first coefficient) calculated based on the frame region G (first small region) is defined. On the other hand, if there exists a pixel whose difference value in the original frame region G (first small region) is larger than the threshold Th, the reference image generated in order to inspect patterns in the inspection region 10 is generated using the filter function in which a filter coefficient (second coefficient) calculated based on the frame region H (second small region) at the position obliquely shifted is defined.

As described above, according to the third embodiment, similarly to the first embodiment, inspection using an unsuitable filter function coefficient can be obviated. Therefore, it is possible to avoid generating a false defect. Thus, the inspection accuracy can be increased. Furthermore, according to the third embodiment, an efficiently suitable filter function coefficient can be acquired.

Embodiments have been explained referring to specific examples described above. However, the present invention is not limited to these specific examples. For example, in Embodiments, although a transmitted illumination optical system using a transmitted light is described as the illumination optical system 170, it is not limited thereto. For example, a reflected illumination optical system using a reflected light may also be used. Alternatively, a transmitted light and a reflected light may be used simultaneously by way of combining a transmitted illumination optical system and a reflection illumination optical system.

Moreover, the filter function and the coefficient of the filter function described above are just an example, it is not limited thereto. Other filter function and other coefficient of the filter function may be used.

While the apparatus configuration, control method, and the like not directly necessary for explaining the present invention are not described, some or all of them can be selectively used on a case-by-case basis when needed. For example, although description of the configuration of the control unit for controlling the inspection apparatus 100 is omitted, it should be understood that some or all of the configuration of the control unit can be selected and used appropriately when necessary.

In addition, any other pattern inspection method and pattern inspection apparatus that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection method comprising:

calculating a first coefficient of a filter function for generating a reference image, by using data of an optical image of each of a plurality of small regions each having a predetermined size selected from an inspection region of a substrate to be inspected on which a plurality of figure patterns are formed, and data of a developed image generated by performing image development of a pattern arranged in the each of the plurality of small regions based on design data used as a basis for forming the plurality of figure patterns on the substrate to be inspected;

calculating a second coefficient of a filter function for generating a reference image, by using data of an optical image of a reference small region selected from the plurality of small regions, and data of a developed image of the reference small region selected;

determining, for each pixel, whether there exists a pixel for which a difference, between a first temporary reference image to be compared with the optical image of the reference small region generated using the filter function in which the first coefficient is defined and a second temporary reference image to be compared with the optical image of the reference small region generated using the filter function in which the second coefficient is defined, is larger than a threshold; and inspecting a pattern in the inspection region by using the reference image generated based on the filter function in which the first coefficient is defined, for each of a plurality of inspection unit regions into which the inspection region of the substrate to be inspected is divided by a size same as the predetermined size, wherein, based on the determining, in a case where the pixel for which the difference is larger than the threshold exists, the inspecting the pattern in the inspection region is stopped beforehand.

2. The method according to claim 1, wherein the first coefficient is calculated as a coefficient matrix for the plurality of small regions, and the second coefficient is calculated as another coefficient matrix for the reference small region selected from the plurality of small regions.

3. A pattern inspection apparatus comprising:

a first coefficient calculation processing circuitry configured to calculate a first coefficient of a filter function for generating a reference image, by using data of an optical image of each of a plurality of small regions each having a predetermined size selected from an inspection region of a substrate to be inspected on which a plurality of figure patterns are formed, and data of a developed image generated by performing image development of a pattern arranged in the each of the plurality of small regions based on design data used as a basis for forming the plurality of figure patterns on the substrate to be inspected;

a second coefficient calculation processing circuitry configured to calculate a second coefficient of a filter function for generating a reference image, by using data of an optical image of a reference small region selected from the plurality of small regions, and data of a developed image of the reference small region selected;

a determination processing circuitry configured to perform determination, for each pixel, of whether there exists a pixel for which a difference, between a first temporary reference image to be compared with the optical image of the reference small region generated using the filter function in which the first coefficient is defined and a second temporary reference image to be compared with the optical image of the reference small region generated using the filter function in which the second coefficient is defined, is larger than a threshold;

a reference image generation processing circuitry configured to generate the reference image by using the filter function in which the first coefficient is defined, for each of a plurality of inspection unit regions into which the inspection region of the substrate to be inspected is divided by a size same as the predetermined size;

an optical image acquisition mechanism configured to include a stage for mounting thereon the substrate to be inspected, an illumination optical system for illuminating the substrate to be inspected, and a sensor for capturing the optical image at an illuminated position, and to acquire the optical image in the inspection region;

a comparison processing circuitry configured to compare the optical image with the reference image generated based on the filter function in which the first coefficient is defined, for the each of the plurality of inspection unit regions; and an inspection control processing circuitry configured to, in a case where, based on the determination, the pixel for which the difference is larger than the threshold exists, stop inspecting the pattern in the inspection region beforehand.

* * * * *